US006878481B2

(12) United States Patent
Bushong et al.

(10) Patent No.: US 6,878,481 B2
(45) Date of Patent: Apr. 12, 2005

(54) METHOD AND APPARATUS FOR REGULATING CHARGING OF ELECTROCHEMICAL CELLS

(75) Inventors: William H. Bushong, Madison, WI (US); Cheeseman Paul, Verona, WI (US); Thomas Kaufman, Middleton, WI (US); Michael Root, Verona, WI (US); Aaron Rositch, Edgerton, WI (US); Marc L. Syvertsen, Madison, WI (US); Viet H. Vu, Verona, WI (US)

(73) Assignee: Rayovac Corporation, Madison, WI (US)

( * ) Notice: Subject to any disclaimer, the term of this patent is extended or adjusted under 35 U.S.C. 154(b) by 397 days.

(21) Appl. No.: 10/045,934

(22) Filed: Oct. 19, 2001

(65) Prior Publication Data

US 2002/0119364 A1 Aug. 29, 2002

Related U.S. Application Data

(60) Provisional application No. 60/242,347, filed on Oct. 20, 2000, provisional application No. 60/290,229, filed on May 11, 2001, provisional application No. 60/280,391, filed on Mar. 30, 2001, provisional application No. 60/309,377, filed on Aug. 1, 2001, and provisional application No. 60/308,970, filed on Jul. 31, 2001.

(51) Int. Cl.[7] .................. H01M 2/12; H01M 10/34; H01M 2/00; H01M 2/08
(52) U.S. Cl. ............... 429/54; 429/59; 429/61; 429/82; 429/175
(58) Field of Search .................. 320/147, 154; 429/59, 61, 82, 218.2, 175, 177, 185, 53, 54

(56) References Cited

U.S. PATENT DOCUMENTS 3,097,975 A * 7/1963 Lutz Horn et al. ......... 429/141

| 3,614,583 | A | 10/1971 | Burkett et al. .............. 320/5 |
|---|---|---|---|
| 3,617,386 | A | 11/1971 | Bosben et al. ............. 136/107 |
| 3,622,397 | A | 11/1971 | Belove .................... 136/178 |
| 3,775,661 | A | 11/1973 | Frezzolini et al. ........... 320/46 |
| 4,025,696 | A | 5/1977 | Tucholski et al. ............ 429/61 |
| 4,028,478 | A | 6/1977 | Tucholski ................. 429/61 |
| 4,035,552 | A | 7/1977 | Epstein .................... 429/58 |
| 4,690,879 | A | 9/1987 | Huhndorff et al. ........... 429/61 |

(Continued)

FOREIGN PATENT DOCUMENTS

| AU | 199926971 A1 | 3/2000 |
|---|---|---|
| GB | 2349284 | 10/2000 |
| JP | 372094 | 11/1963 |
| JP | 09320562 A | 12/1997 |
| WO | WO 96/35253 | 7/1996 |

OTHER PUBLICATIONS

Carson, Jr. et al., "Rapid Recharging of Nickel–Cadmium Batteries," *Power Sources 2* pp. 181–197 (1968).

(Continued)

*Primary Examiner*—Patrick Ryan
*Assistant Examiner*—Thomas H. Parsons
(74) *Attorney, Agent, or Firm*—Quarles & Brady, LLP

(57) ABSTRACT

A rechargeable electrochemical cell is provided having a pressure-responsive apparatus for determining a charge termination point. In particular, a reversible pressure-responsive switch may be disposed in a cap at the open end of a rechargeable metal hydride cell. The reversible pressure-responsive switch may also contain a vent system for releasing the cell internal pressure. Alternatively, a rechargeable cell may include a strain gauge disposed in its outer surface whose resistance changes as the outer surface of the battery expands due to internal pressure accumulation during charging. Additionally, a rechargeable cell is used combination with a charging source that can supply constant voltage, constant current, alternating current, or voltage that varies between a minimum threshold and a maximum threshold.

75 Claims, 20 Drawing Sheets

U.S. PATENT DOCUMENTS

| | | | |
|---|---|---|---|
| 4,756,983 A | 7/1988 | Tucholski | 429/61 |
| 4,818,641 A | 4/1989 | Ledenican | 429/61 |
| 4,855,195 A | 8/1989 | Georgopoulos et al. | 429/54 |
| 4,871,553 A | 10/1989 | Huhndorff | 429/61 |
| 4,937,153 A | 6/1990 | Huhndorff | 429/61 |
| 4,943,497 A | 7/1990 | Oishi et al. | 429/53 |
| 4,959,604 A | 9/1990 | Cuesta | 320/20 |
| 4,975,341 A | 12/1990 | Tucholski et al. | 429/62 |
| 4,992,339 A | 2/1991 | Georgopoulos | 429/70 |
| 4,992,344 A | 2/1991 | Coppers | 429/61 |
| 5,026,615 A | 6/1991 | Tucholski | 429/61 |
| 5,028,860 A | 7/1991 | Amano | 320/23 |
| 5,057,382 A | 10/1991 | Tucholski | 429/61 |
| 5,188,909 A | 2/1993 | Pedicini | 429/7 |
| 5,405,715 A | 4/1995 | Dawson et al. | 429/54 |
| 5,418,082 A | 5/1995 | Taki et al. | 429/53 |
| 5,508,598 A | 4/1996 | Al-Abassy | 320/14 |
| 5,541,496 A | 7/1996 | Simmonds | 320/36 |
| 5,589,755 A | 12/1996 | Kaite et al. | 320/21 |
| 5,609,972 A | 3/1997 | Kaschmitter et al. | 429/56 |
| 5,637,981 A | 6/1997 | Nagai et al. | 320/22 |
| 5,691,073 A | 11/1997 | Vu et al. | 429/7 |
| 5,705,290 A | 1/1998 | Azema | 429/53 |
| 5,721,480 A | 2/1998 | Morioka | 320/30 |
| 5,741,606 A | 4/1998 | Mayer et al. | 429/53 |
| 5,747,187 A | 5/1998 | Byon | 429/58 |
| 5,747,969 A | 5/1998 | Tamai | 320/141 |
| 5,872,444 A | 2/1999 | Nagano et al. | 320/106 |
| 5,879,832 A | 3/1999 | Vu et al. | 429/62 |
| 5,903,136 A | 5/1999 | Takahashi et al. | 320/128 |
| 5,905,362 A | 5/1999 | Nagano et al. | 320/125 |
| 5,985,479 A | 11/1999 | Boolish et al. | 429/56 |
| 5,998,051 A | 12/1999 | Poirier et al. | 429/7 |
| 6,008,620 A | 12/1999 | Nagano et al. | 320/106 |
| 6,018,286 A | 1/2000 | Quinn et al. | 337/140 |
| 6,063,518 A | 5/2000 | Dewulf et al. | 429/53 |
| 6,069,551 A | 5/2000 | Kalapodis et al. | 337/140 |
| 6,078,244 A | 6/2000 | Quinn et al. | 337/140 |
| 6,080,506 A | 6/2000 | Davis et al. | 429/61 |
| 6,083,639 A | 7/2000 | McHugh et al. | 429/62 |
| 6,087,810 A | 7/2000 | Yoshida | 320/139 |
| 6,104,165 A | 8/2000 | Miyamoto et al. | 320/125 |
| 6,118,254 A | 9/2000 | Faulk | 320/141 |
| 6,207,319 B1 | 3/2001 | Nam | 429/163 |
| 6,207,320 B1 | 3/2001 | Song et al. | 429/171 |
| 6,366,057 B1 | 4/2002 | Nakatsuji | 320/163 |
| 6,376,120 B1 | 4/2002 | Azema | 429/61 |

OTHER PUBLICATIONS

Coyle et al., "Ultra–Fast Nickel Cadmium Batteries Charger," *New Developments;in Electric Vehicles for Disabled Persons* pp. 8/1–8/5 (1995).

Falcon, C.B., "Fast Charge Termination Methods for NiCd and NiMH Batteries," *PCIM Journal* pp. 10–18 (1994).

Fujikawa, Kaoru, "The New Cylindrical Sealed Ni–Cd Battery, 250 AAP, and its Charger, ZLC 8.4–0.35T," *Yuasa Jiho* 61:35–41 (1986).

Gladstone et al., "Demand Pulse Charging for Nickel–Cadmium Batteries," *Proc. Annual Power Sources Conference, 1969* 23:56–59 (1969).

Gutekunst, K., "Contribution to the Examination of Charging Behavior of Sealed Nickel Cadmium and lead Acid Batteries," *Caplus* (2002).

Hoshino, K., "Ultra Rapid Charge Ni–Cd Battery" *National Technical Report* 37:59–63 (1991).

Juvinall, G.L., "A Novel Negative–Limited Sealed Nickel–Cadmium Cell," *9th Intersociety Energy Conversion Engineering Conference Proceedings*, pp. 881–887 (1974).

Kantner et al., "Investigation of Hermetically Sealed Maintenance–Free, High–Rate, Nickel–Cadmium Batteries for Aircraft Applications," *Contract Report for Air Force Aero Propulsion Laboratory* Project No. 8173 (1996).

Latner, N., "A Fast Charger for Nickel–Cadmium Batteries," *Health Physics* 23:580–582 (1972).

Tsuda, S., "Quick Charge Characteristics of Sealed Nickel–Cadmium Rechargeable Batteries," *National Technical Report* 24:313–320 (1978).

Watanabe, Y., "PANANICA Quick Chargers for Portable VTR and Color Camera," *National Technical Report* 24:393–398 (1978).

Wuidart, L., "Ultra Fast NiCd Battery Charger with Integrated Magnetic," *Official Proceedings of the Nineteenth International intelligent Motion (PCIM) Conference* pp. 352–365 (1991).

Wuidart, L., "Monitoring an Ultra Fast Battery Charger with a ST6210 Micro–Controller," *EPE Journal* 2:35–38 (1992).

Yang et al, "Charge Performance of a Commercial Nickel Metal Hydride Traction Battery System," *Journal of the Electrochemical Society* 148:A1023–A1028 (2001).

Xiao Guang Yang et al., Charge Performance of a Commercial Nickel Metal Hydride Traction Battery System, Journal of The Electrochemical Society, 148 (9) A 1023–A1028.

* cited by examiner

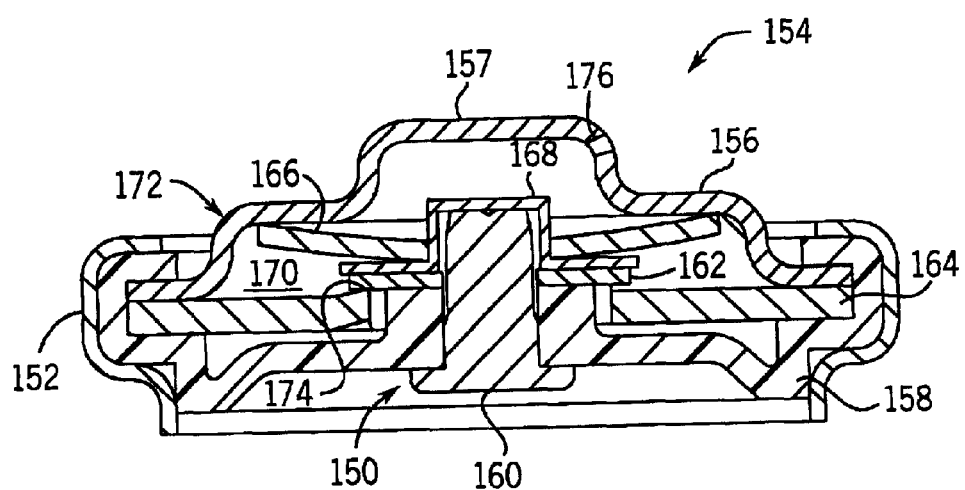
FIG. 7
FIG. 8
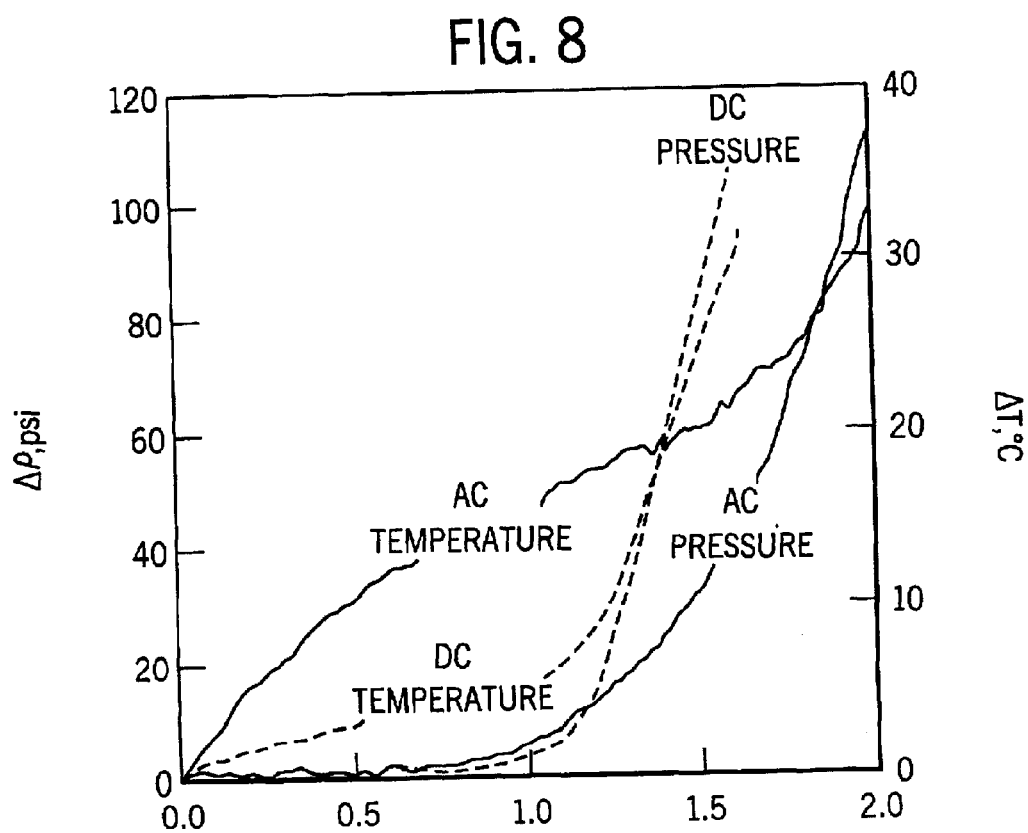

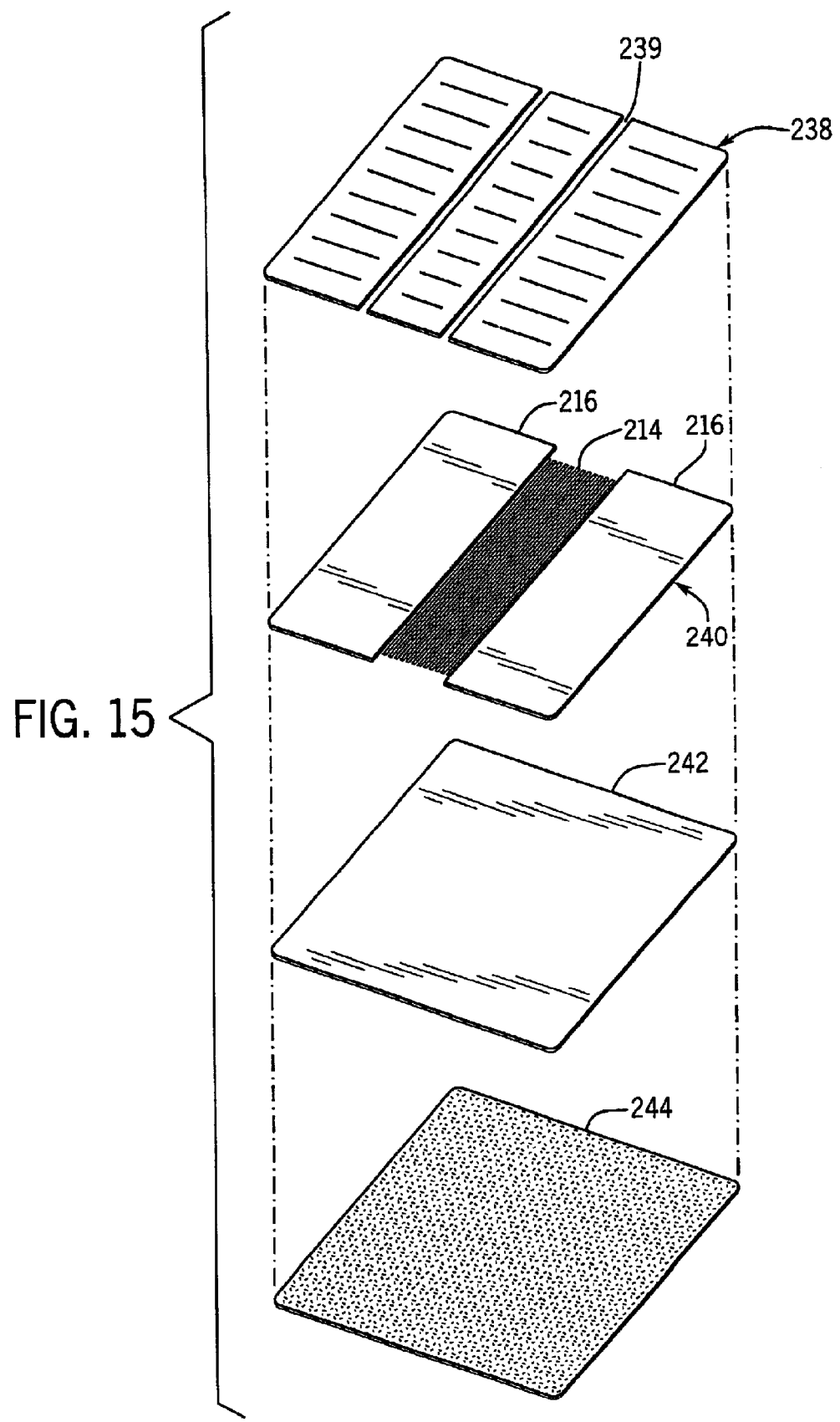

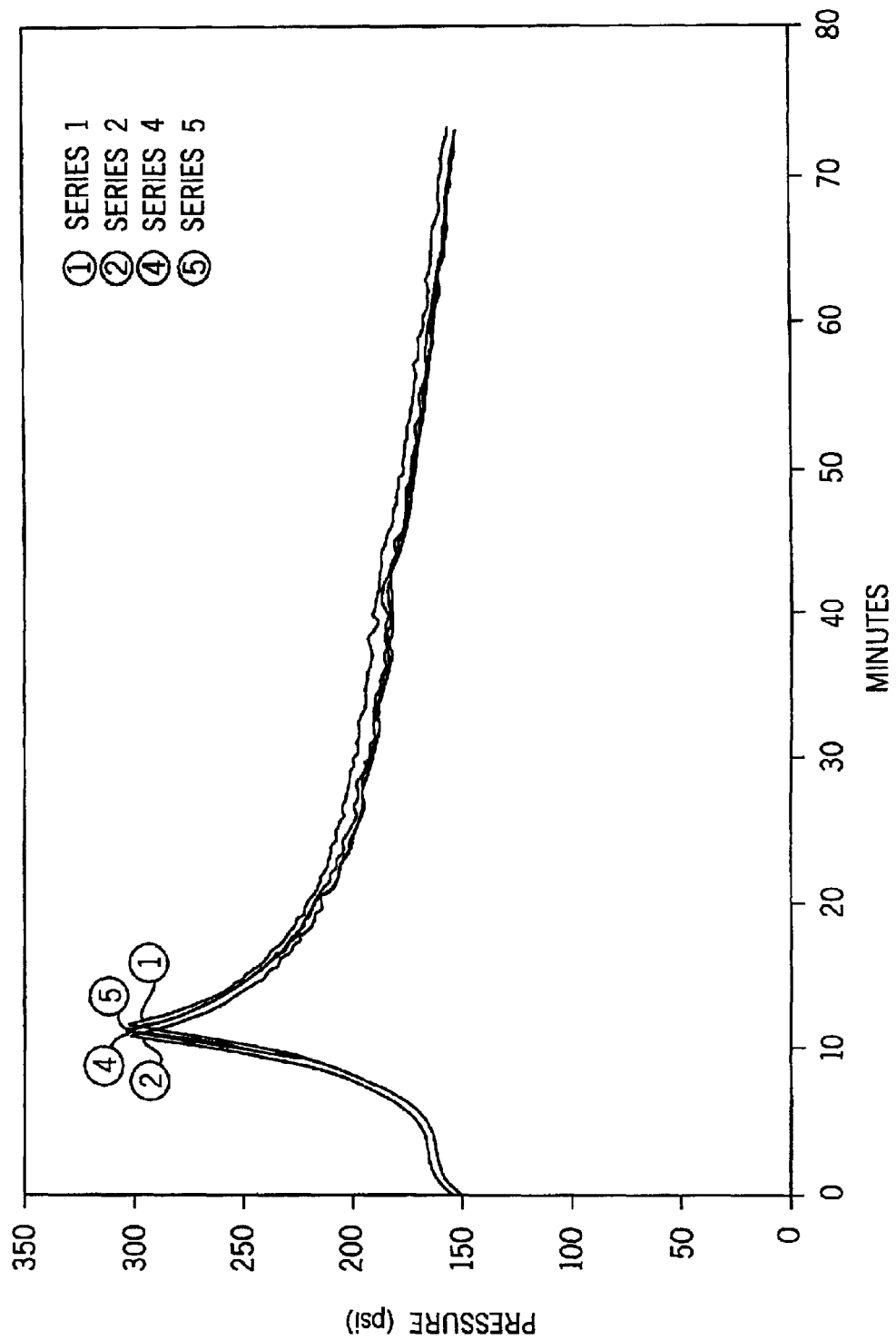

METHOD AND APPARATUS FOR REGULATING CHARGING OF ELECTROCHEMICAL CELLS

CROSS-REFERENCE TO RELATED APPLICATIONS

The present application claims priority to U.S. patent application Ser. No. 60/242,347, filed on Oct. 20, 2000 and entitled "Pressure-Responsive Charge Regulating Switch"; U.S. patent application Ser. No. 60/290,229, filed May 11, 2001 and entitled "Pressure-Responsive Charge Regulation Switch; U.S. patent application Ser. No. 60/280,391, filed Mar. 30, 2001 and entitled "Pressure-Responsive Charge Regulation Switch"; U.S. patent application Ser. No. 60/309,377, filed Aug. 1, 2001 and entitled "Strain Gauge-Based Charging Control for Nickel-Based Rechargeable Cell; and U.S. patent application Ser. No. 60/308,970, filed Jul. 31, 2001 and entitled "Charge Regulating Switch"; the disclosures of each of which are hereby incorporated by reference as if set forth in their entirety herein.

STATEMENT REGARDING FEDERALLY SPONSORED RESEARCH OR DEVELOPMENT

Not Applicable.

BACKGROUND OF THE INVENTION

The present invention relates generally to nickel rechargeable cells, such as nickel metal hydride (NiMH) cells, and more specifically to a method and apparatus for automatically reversibly terminating a cell charging process. This invention may also be employed in nickel cadmium (NiCd) cells.

For greater convenience and portability, many modern electrical appliances and consumer products may be operated to draw electric current from batteries of standard size and electrical performance. For convenience and economy, various rechargeable batteries have been developed, such as nickel metal hydride cells and the like.

Metal hydride cell technology provides excellent high-rate performance at reasonable cost when compared to nickel cadmium and lithium ion technology. Moreover, metal hydride cells have about a 50% higher volumetric energy density than NiCd cells and about equal to lithium ion cells. The internal chemistry of metal hydride rechargeable cells has an impact on the ability to charge such cells. Issues affecting the ability to charge nickel rechargeable cells arise as a result of the internal chemistry of such cells. When a nickel rechargeable cell approaches a full charge state, oxygen is generated at the cathode as follows:

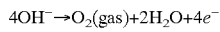

$4OH^- \rightarrow O_2(gas) + 2H_2O + 4e^-$

The oxygen gas diffuses across a gas-permeable separator to the anode where it is recombined into cadmium hydroxide or water as follows:

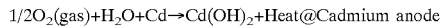

$1/2 O_2(gas) + H_2O + Cd \rightarrow Cd(OH)_2 + Heat$ @Cadmium anode

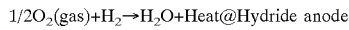

$1/2 O_2(gas) + H_2 \rightarrow H_2O + Heat$ @Hydride anode

When recharging such cells, it is important to ascertain when the cell has become fully charged. For example, if a cell were to become overcharged for an extended period of time, the pressure buildup within the cell could cause the cell to fail as well as electrolyte to leak, thereby further subjecting the charger to potential damage.

Metal hydride rechargeable cells are typically recharged by applying a constant current rather than constant voltage to the cells. In this scheme, cell voltage increases gradually until the cell approaches full charge whereupon the cell voltage peaks. As the cells reach the overcharge state, the released heat causes the cell temperature to increase dramatically, which in turn causes the cell voltage to decrease. Cell pressure also rises dramatically during overcharge as oxygen gas is generated in quantities larger than the cell can recombine. Unfortunately, it is known that the rate of pressure change is several orders of magnitude faster than the rate of voltage or temperature change. Thus, conventional constant current charge interruption methods cannot support a very fast charge rate without risking internal pressure buildup, rupture, and electrolyte leakage. For this reason, metal hydride cells may be provided with safety vents.

One common way to reduce pressure buildup at the full-charge state is to provide an anode having a excess capacity of greater by 40–50% more than the cathode, a gas-permeable separator, and limited electrolyte to accommodate effective diffusion of gasses. This avoids the production of hydrogen gas at the anode while permitting the oxygen to recombine with the anode material. When a cell reaches full charge, oxygen gas continues to be produced at the cathode, but hydrogen is not produced from the anode. If hydrogen were produced, the cell could rupture from excess pressure. The oxygen recombination reaction therefore controls the cell pressure, as is illustrated in FIG. 1. The oxygen gas then crosses the separator and reacts with the anode material. Downsides of this arrangement include reduced cell capacity and corresponding shorter cell cycle life due to degradation of the anode from overcharge with oxidation and heat.

It is important to stop charging a cell or plurality of cells when a full charge state is reached to avoid possible cell rupture or leakage due to the increasing internal gas pressure. Conventional metal hydride rechargeable cells cannot themselves signal a suitable charge termination point. One must instead rely upon expensive and sophisticated detection circuitry in an associated charger device to determine when charging should end. Charge termination is typically determined by the detection circuitry based on (1) peak cell voltage, (2) peak cell temperature (TCO), (3) duration of charging time, (4) –dV, and (5) dT/dt. Each known method for terminating a constant current charge has disadvantages. For example, time-based termination can be unreliable except at very low charge rates because the cell can become overcharged before termination.

Charge termination based on peak voltage can be unreliable at the end of the charging period because an overvoltage condition can exist before termination. Termination based on a voltage decline (–dV) is necessarily associated with oxygen recombination and the accompanying detrimental temperature rise. In practice, this means that voltage detection must be accurate and fast. Unless the ambient temperature is steady, it can be difficult to accurately measure a change in voltage. Moreover, when the charge rate is slower than 0.3 C, the voltage drop measurement is too small to be detected accurately. A charge rate of 1 C draws a current equal to the rated capacity of the electrochemical cell or battery. Termination based only on peak temperature is also easily affected by ambient temperature changes. Termination based upon the rate of change in temperature over time (dT/dt) is somewhat more reliable than detecting an absolute temperature change because it is less subject to effects caused by ambient temperature change and because there is less negative effect on cycle life, but it is still based on heat which is detrimental to cell performance and cycle life. This is because temperature increases faster, and, in fact, precedes, the drop in voltage. Accordingly, there is somewhat less risk of rupture and leakage than in the other methods noted above. This makes it the most common charge termination method in use today.

Others in the art have sought pressure based mechanisms for breaking the connection between the electrode and the cell terminal when pressure exceeds a predetermined level. For example, U.S. Pat. No. 5,026,615 discloses a pressure-sensitive switch in an end cap assembly that comprises a conductive spring member, a nonconductive fulcrum member and a moveable conductive member. The conductive spring member is in electrical connection with a terminal on one end and with the moveable conductive member on the other end. The moveable conductive member is in turn in electrical connection with an electrode. As the internal cell pressure increases, the moveable conductive member exerts force on the spring member, which pivots on the nonconductive fulcrum member and disconnects from the terminal. This patent therefore requires a first and second contact, one of which being movable with respect to the other and rotatable about a fulcrum in order to pivot with respect to the other contact. This arrangement requires more essential parts than necessary, and further requires that the assembly be constructed with tight tolerances, thereby increasing complexity as well as the cost of production.

Other examples of these technologies include U.S. Pat. Nos. 5,747,187, 5,405,715, 5,741,606, 5,609,972, 6,018,286, 6,078,244, and 6,069,551, all of which are incorporated herein by reference as if set forth in their entirety. Some such mechanisms prevent a pressure-induced rupture of the cell but in doing so permanently disable the cell. In other cases, reversible switch devices prevent cell rupture, but do not detect an early charge termination state to avoid heat build up and to ensure superior cell performance and cycle life.

With constant voltage charge, on the other hand, the charging current is high at the beginning of the charge, when the cell can accept higher currents, and then decreases to lower levels as the cell approaches full charge. When constant voltage charging, the above-noted signals for the end of a constant current charge process are not useful because as the cell approaches the full charge state, the cell voltage is constant and the cell temperature is leveling. Like a constant current charge approach, charging time cannot be used for the constant voltage charge when the charge rate is higher than 0.3 C due to run away of pressure that can damage devices. As a result of these shortcomings it has been difficult to identify an effective termination signaling means and constant voltage charging for metal hydroxide cells has therefore been generally considered to be impractical.

With alternating current charge, the charging current may be modulated at a defined frequency or combination of frequencies to produce a net positive current that enables the cell to become charged. An alternating current charge can provide a fast charge with less pressure buildup and lower temperature increase than constant current or constant voltage charge. However, when using an alternating current charge, the above-noted signals for the end of a constant current charge process are not useful because as the cell approaches the full charge state, changes in the cell voltage are difficult to detect above the voltage response to the applied alternating current. As a result it has been difficult to identify an effective termination signaling means and alternating current charging for metal hydroxide cells has also therefore been generally considered to be impractical. It should be appreciated that an alternating current charge is used throughout the present disclosure to mean a varying current that produces a net positive charge, such as a modulated alternating current. For example, an alternating current may be half-wave rectified or full-wave rectified to produce a series of current pulses, or an alternating current may be offset by a desired DC current.

Published Australian patent application number 199926971 A1 discloses a method for fast charging a nickel metal hydride battery in an implant by transcutaneous transmission of electric power from an external power-transmission part to a power-receiving part in the implant. The patent application considers the desirability of an initial rapid high-current charge phase when the internal cell resistance is low, followed by a second lower-current, constant cell voltage charge phase to ensure that the cell is charged only with as much energy as the electrochemical state allows, without excess gassing or heating of the cell. Harmful effects on the battery are precluded while, at the same time, the charging rate remains high. In the method disclosed therein, a first of two charging phases includes the step of allowing a relatively high constant charging current to flow to the power receiving part while the cell voltage rises until it reaches a predetermined limiting charging voltage. In the second charging phase, the charging current is lower than the current level at the end of the first phase while the cell voltage is kept at least approximately at the predetermined constant voltage value. In the Australian patent application, the second charge phase ends when an associated microelectronic controller determines that the rate of change of the charging current over time does not reach a predetermined slope. This cumbersome two-step constant current/constant voltage approach is typical of prior approaches in the art.

In summary, as the metal hydride rechargeable cell reaches its fully charged state, oxygen is evolved from the cathode, thereby increasing the internal cell pressure and driving the exothermic oxygen recombination reaction. At a very high constant current charge rate, usually less than one hour, charge current is still very high at the end of charge. This results in severe heating of the cell and shortened cycle life. The available methods of terminating constant current charge are not very reliable when cell temperature is high. In addition, cell heating is detrimental and it is desirable to terminate the charge before significant cell heating at the stage where damaging pressure begins to rise within the cell.

What is therefore needed is a method and apparatus for more accurately determining the charge termination point for a cell that is fully rechargeable under constant voltage, constant current, and alternating current/voltage charging.

What would be desirable is a reversible regulating switch that is responsive to a stimulus for determining a charge termination point that is less complex and less destructive than those currently available.

What is also desirable is a more cost-efficient and reliable charge termination detection apparatus than that currently achieved, and that is compatible with conventional rechargeable batteries.

BRIEF SUMMARY OF THE INVENTION

In one aspect the invention provides a rechargeable electrochemical cell that is suitable for terminating the charge when the internal pressure reaches a maximum predetermined threshold. In one preferred form, the cell includes an outer can defining an internal cavity with an open end, a positive and negative electrode disposed in the internal cavity, and a terminal end cap enclosing the open end.

The cell further includes an end cap assembly having a grommet that extends radially inwardly from the can that flexes from a first position towards a second position in response to internal cell pressure. A first conductive element is in electrical communication with the terminal end cap, and a second conductive element is in electrical communication with the positive electrode, and in removable electrical communication with the first conductive element. The second conductive element is also in mechanical communication with the grommet. When the internal pressure within the cell accumulates beyond a predetermined threshold, the grommet flexes to remove the first and second conductive elements from electrical communication, thereby terminating the charge. Once the internal pressure drops below the predetermined threshold, the grommet returns to its first position.

In accordance with one embodiment, the second conductive element comprises (a) a first contact having one end extending from the positive electrode, and a second end opposite the first end; (b) a second contact extending through the grommet having a first end in contact with the second end of the first contact, and a second end opposite the first end; and (c) a third contact having a first end in contact with the second end of the second contact, and a second end opposite the first end and in removable contact with the first conductive element.

In another preferred form, the second conductive element is connected to the grommet and at least partially axially aligned with the first conductive element, and is displaced axially outwardly when the grommet is in the second position. A nonconductive spring member may be disposed between the terminal cap and the grommet to limit the amount of grommet displacement. A stop may be disposed axially downstream of the first conductive element so as to limit its movement when the grommet flexes to its second position.

If desired, the cell may further include a gas impermeable separator disposed between the positive and negative electrodes.

In another aspect, the invention provides a vent extending through the terminal end cap that allows gasses to escape from the cell for pressure dissipation. In particular, the grommet separates the internal cavity of the can from a second internal cavity disposed within the end cap. An opening extends through the grommet to provide a conduit between the two cavities, such that gasses may escape from the internal cavity of the can out the vent. If desired, a plug may be disposed within the opening that is displaceable when the internal pressure reaches a predetermined threshold.

The invention further provides a rechargeable electrochemical cell charging system having (1) an electrochemical cell comprising (a) an outer can defining an internal cavity with an open end, and anode and cathode disposed in the internal cavity, and a terminal end cap enclosing the open end; (b) a linkage that establishes an electrical connection between the terminal end cap and the first electrode; and (c) a switch responsive to high pressure to break the linkage; and (2) a cell charger that receives the electrochemical cell and supplies a constant voltage charge thereto, wherein internal pressure is generated during charging that activates the switch to terminate the charge when the internal pressure exceeds a predetermined pressure threshold. In another aspect, the charger supplies an alternating current charge. In another aspect, the charger supplies a voltage charge that varies between a predetermined maximum threshold and a predetermined minimum threshold.

In another aspect, the present invention provides a battery that comprises a plurality of cells connected in series wherein at least one of the cells is a cell that contains the pressure-responsive switch according to the invention. It will be understood that the plurality of cells can be charged and recharged according to the invention, but that when the pressure in any one cell equipped with the switch of the invention rises to an unacceptably high level, the current flow through the entire circuit will be interrupted and charging will be terminated.

In another preferred form, the cell is chargeable under a constant voltage charge, alternating current charge, constant current charge, and a voltage that varies between a minimum threshold and maximum threshold. As a result, the cell may achieve fast charging for less than an hour rate.

In another aspect, a rechargeable electrochemical cell charging system includes a rechargeable cell having a gauge on its outer surface operable to send a signal indicating that the outer surface is expanded at a rate that is beyond a predetermined threshold. A battery charger is also provided that (1) supplies a charge to the rechargeable cell, wherein the outer surface of the battery expands as the charge is supplied, (2) receives the signal from the gauge, and (3) terminates the charge based on a predetermined rate of change of outer surface expansion.

In one preferred form, the gauge is a strain gauge having two distal ends connected to two respective conductive contact bands, and wherein the charger further comprises conductive leads connected to the contact bands to measure electrical resistance thereacross.

In another preferred form, the signal from the gauge is a resistance that varies in a predictable manner relative to the outer surface expansion, and the charger further includes a processor operable to measure the resistance across the strain gauge.

In another preferred form, the charging assembly further includes a temperature sensor for sensing the internal temperature of the cell, such that the battery charger further terminates the charge based on a predetermined condition of temperature and outer surface expansion.

In another aspect, methods are also provided for using these types of electrochemical cells and charging assemblies.

The present invention thus provides rechargeable cells, charging systems, and methods for achieving reliable charge termination of metal hydride cells based on internal pressure to prevent over-pressurization of the cell that could otherwise cause the cell to fail.

The foregoing and other aspects of the invention will appear from the following description. In the description, reference is made to the accompanying drawings which form a part hereof, and in which there is shown by way of illustration, and not limitation, a preferred embodiment of the invention. Such embodiment does not necessarily represent the full scope of the invention, however, and reference must therefore be made to the claims herein for interpreting the scope of the invention.

BRIEF DESCRIPTION OF THE SEVERAL VIEWS OF THE DRAWINGS

FIG. 7 is a sectional side elevation view of the positive terminal of a cell incorporating a switch constructed in accordance with an alternate embodiment of the invention;

FIG. 8 is a graph plotting capacity (Ah) vs. ΔP (psig) for a nickel metal hydride cell during alternating current and constant current charge;

FIG. 15 is an exploded assembly view of the label illustrated in FIG. 10; and

FIG. 17 is a graph plotting internal cell pressure (psig) vs. time (min) for a plurality of cells;

DETAILED DESCRIPTION OF THE PREFERRED EMBODIMENT

Figure 1:
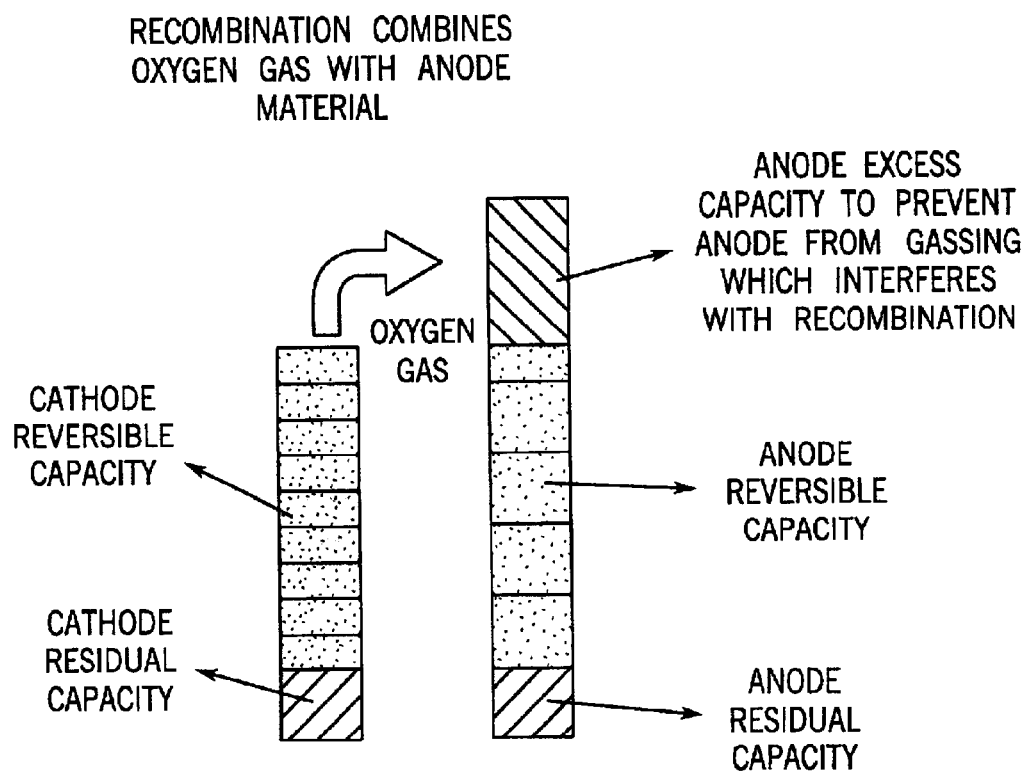
FIG. 1 is a schematic illustration of the oxygen recombination reaction controlling cell pressure.
Figure 2A:
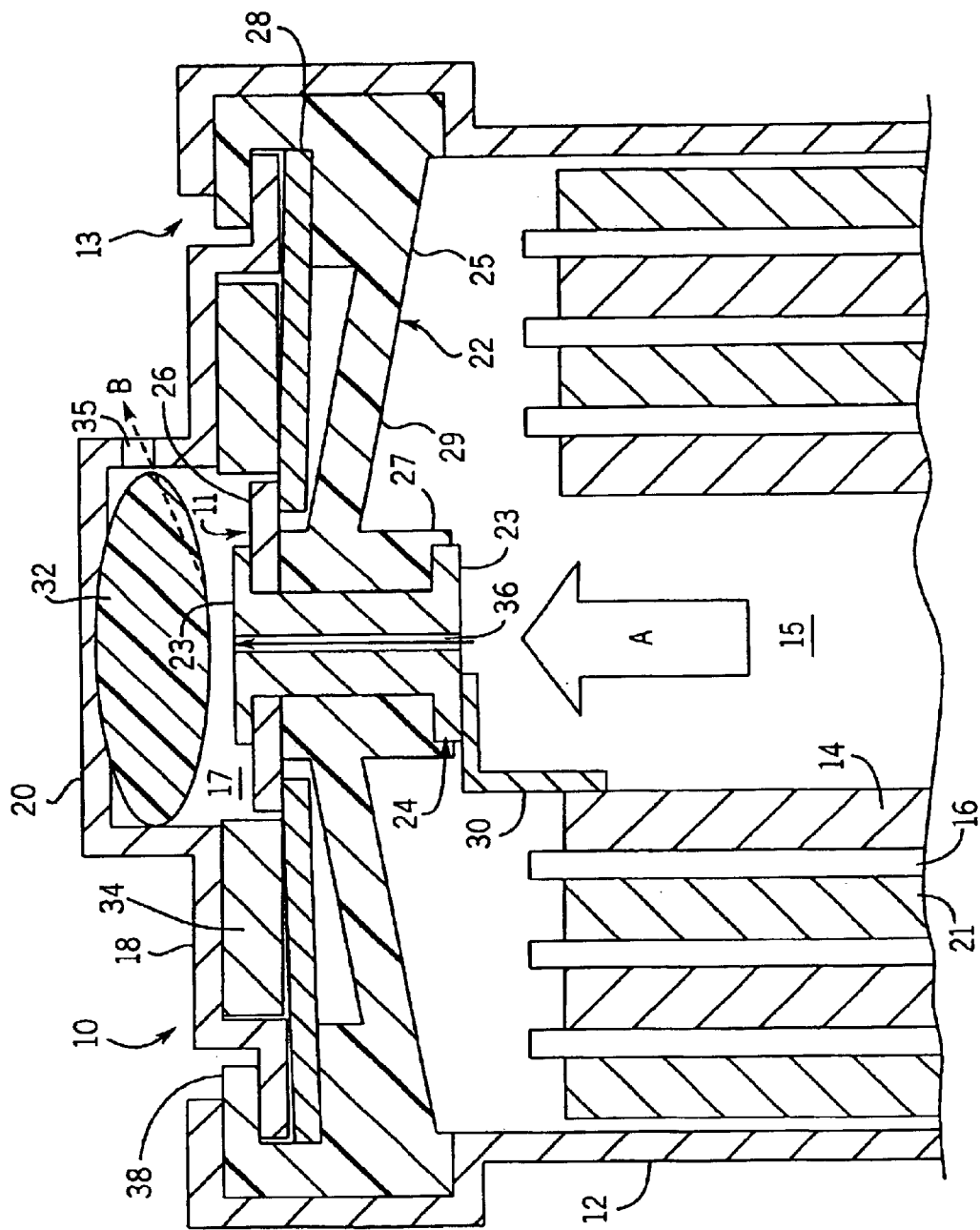
FIG. 2A is a cross-sectional view of an end cap assembly containing a pressure-responsive switch and a pressure-release vent constructed in accordance with a preferred embodiment of the invention, illustrated in a low pressure position.

Referring now to FIG. 2A, an axially extending cell includes a can 12 having closed end (not shown) and an open end 13 disposed opposite the closed end and axially downstream therefrom. A cap assembly 10 includes a positive terminal end cap 18 that is secured in the open end of the negative can 12 to provide closure to the cell. In particular, the end cap assembly 10 and the open end of the can 12 are adapted in size and shape such that the end cap assembly 10 is sealingly accommodated in the open end by crimping the negative can 12 during assembly of a cylindrical rechargeable metal hydride cell. The closed end of the can is conventional and is not shown.

A positive (e.g., nickel hydroxide) electrode 14 is in removable electrical connection with the positive terminal cap 18, as will become more apparent from the description below. The cell further contains a negative electrode 21 (e.g., hydride electrode) that is in electrical connection with the can 12, and an alkaline electrolyte (e.g., potassium hydroxide) alone or in combination with other alkali metal hydroxides. The electrodes are disposed in an internal cavity 15, and are separated by a separator 16. A cell comprising the can 12 and the end cap assembly 10 of the invention can further comprise conventional positive 14 and negative 21 wound electrodes in its interior, although the relative size of these electrodes can be adjusted to meet the physical and electrical specifications of the cell.

The positive terminal cap 18 has a nipple 20 that is sized and shaped to provide a positive terminal to the cell having a pressure-responsive switch 11 constructed in accordance with the present invention. The pressure-responsive switch 11 comprises a flexible non-conductive mono-stable grommet 22 adapted in size and shape to fit securely in the open end Grommet includes a radially outer seal 25, an inner hub 27, and an arm 29 that extends substantially radially and connects the seal to the hub. Grommet 22 further includes a centrally disposed opening 15 extending axially through the hub 27 in which is seated a conductive spool-shaped connector 24 having a pair of oppositely disposed radially extending outer flanges 23. The space between the outer surface of grommet 22 and inner surface of terminal end cap 18 defines a cavity 17 in the end cap assembly 10.

Connector 24 is securely fixed in the opening of grommet 22 such that the conductive connector moves in concert with the grommet. A first annular conductive contact 26, which is a metal washer in accordance with the illustrated embodiment, surrounds the hub of connector 24 and has an upper surface in electrical contact with the upper flange 23. A second annular conductive contact 28 (which can also be a metal washer) surrounds the grommet and is positioned axially upstream and adjacent the first contact 26. The first and second contacts 26, 28 are circular plates in FIG. 2A but they can be provided in other shapes, as illustrated, for example, in FIGS. 3–5. Contact 28 has an upper surface that is in electrical connection with the terminal cap, and in removable mechanical (and therefore electrical) connection with the bottom surface of the first contact 26, as will become more apparent from the description below.

The grommet 22 can be formed of any sufficiently flexible, nonconductive inert material that does not adversely impact the cell chemistry. Suitable materials include but are not limited to polypropylene, polyolefin and nylon and their equivalents.

The outer seal 25 of grommet 22 includes an upwardly and radially inwardly extending peripheral lip 38 that is shaped and sized to form a tight seal with the open end of the can to provide a barrier between the interior and the exterior of the cell. The lip 38 also partially defines a cavity in the outer seal 25 in which the outer end of terminal end cap 18 and second contact 28 are disposed. The lip 38 presents a radially outer convex surface to permit the can 12 to be crimped over the grommet 22 during assembly of the cell. When the axially downstream end of can 12 is crimped over the grommet 22 during assembly, a tight seal is provided between the grommet 22, second contact 28, and terminal end cap 18 to isolate the interior of the cell from the ambient environment. An optional sealant such as asphalt or tar can also be employed between the end cap assembly 10 and the can 12 to strengthen the seal.

A flexible conductive tab 30 electrically connects the conductive connector 24 to the positive electrode 14 in the interior of the cell. The conductive connector 24 can be an eyelet or rivet that is secured in the central opening by crimping at its ends to provide flanges 23 that secure the hub 27 of grommet 22 and the first contact 26. The conductive connector 24 is in electrical and physical contact with the first contact 26 thereby helping to secure the conductive connector 24 into position.

FIG. 2A illustrates the end cap assembly in a low pressure state, such that the grommet 22 is in its stable position. In this low pressure state, the positive electrodes 14 are in electrical connection with the positive terminal cap 18 via the conductive tab 30, connector 24, first contact 26, and second contact 28. Accordingly, the cell may be charged by introducing a recharging current or voltage to the cell. Advantageously, when internal pressure within the cell accumulates beyond a predetermined threshold, the grommet 22 flexes (reversibly) axially downstream along the direction of arrow A to bias the pressure-responsive from the first position illustrated in FIG. 2A to a second position illustrated in FIG. 2B. It should be appreciated that the predetermined threshold may depend on the intended type of charge being used (e.g. constant current, constant voltage, etc . . . ), and may be determined by the material selected for the grommet, and thickness and flexibility of the arm 29.

Figure 2B:
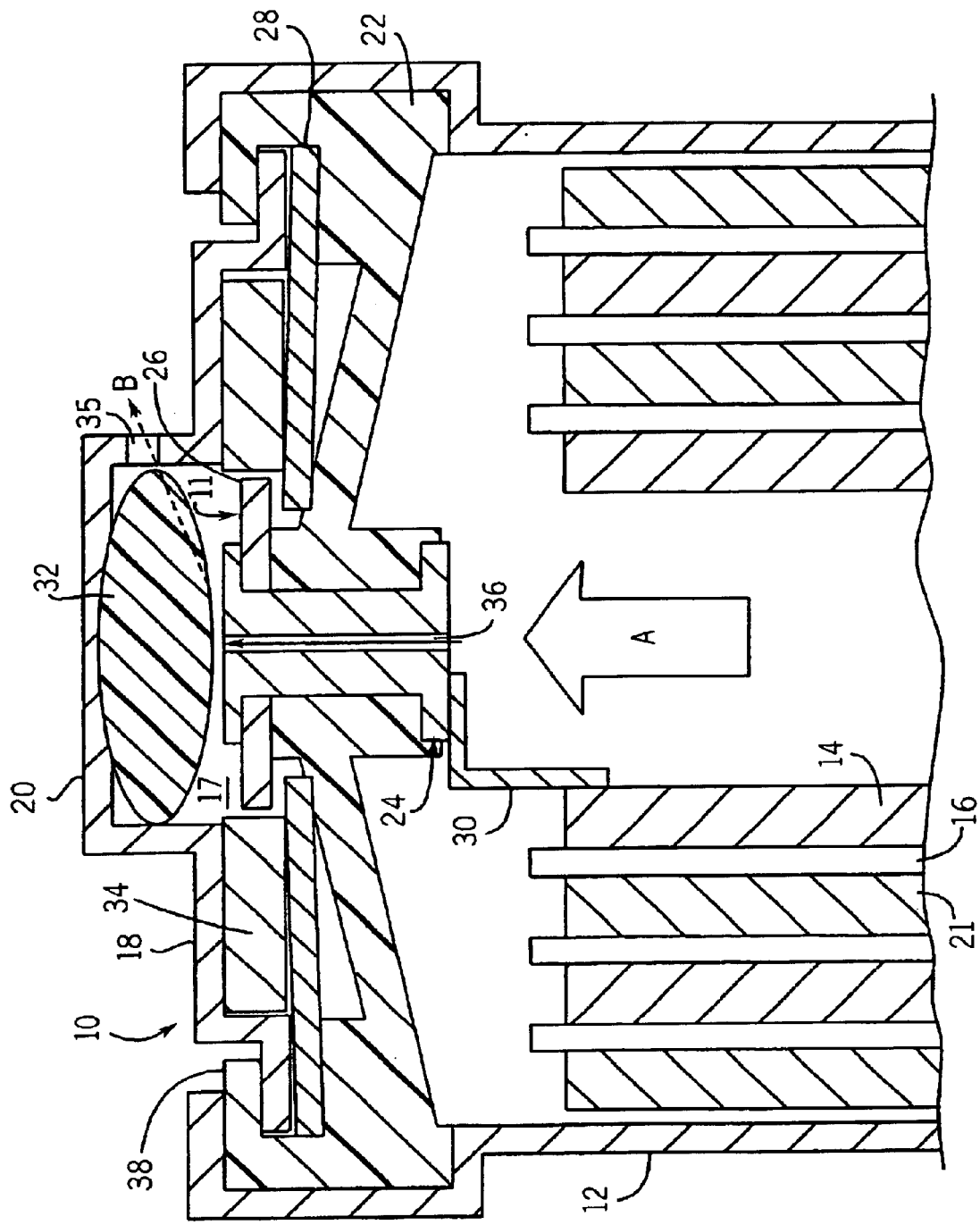
FIG. 2B is a cross-sectional view of the end cap assembly illustrated in FIG. 2A in a high pressure position.

Referring now to FIG. 2B, when the internal pressure within the cell exceeds the predetermined threshold sufficient to flex the grommet 22, the hub 27 is translated axially downstream, thereby also translating the first contact axially downstream with respect from the second contact 28, and removing the electrical connection therebetween. As a result, an electrical connection at the nipple 20 will not transfer to the electrodes 14 within the cell, and further charging is prevented until the overpressure situation subsides.

Optionally, an insulating overpressure stop 32 can also be provided in an interior cavity defined by the nipple 20. The overpressure stop 32 can also be used to pre-load the contact pressure as desired and can limit motion of the conductive connector 24 in the direction of the nipple 20 when internal cell pressure is high. A stop washer 34 can also optionally be disposed between the second contact 28 and terminal end cap 18 to restrain the movement of the second contact when the grommet 22 flexes, thereby further insuring that the electrical connection will be severed between the two contacts during a high pressure state.

It should be appreciated that a plurality of cells could be installed in a battery pack and connected in series within a charger that is configured to supply a constant voltage or constant current charge to the cell. So long as at least one of the cells includes a pressure responsive switch in accordance with the invention (assuming pressure accumulates similarly within each cell), charging will terminate once the pressure within that cell activates the switch to remove electrical communication between the end cap 18 and electrode 14. Alternatively, each cell could include the switch such that the charging of all cells would terminate once one of the cells reaches a maximum permissible internal pressure. Alternatively, the cells could be connected in parallel to a charging source, in which case each cell would include a pressure responsive switch in accordance with the present invention.

FIGS. 2A–B also illustrate an optional a safety system for venting excess pressure (gas) from the cell when in an overpressure condition. In particular, the conductive connector 24 can define a centrally disposed pressure release channel 36 extending axially there through. Accordingly, gas produced at the electrodes is able to flow axially downstream from the cell interior 15 and through channel 36 to end cap interior 17. The end cap 18 also defines one or more outlets 35 extending there-through to enable the gas to flow from the end cap assembly 10 to the outside environment. The outlet can be secured against undesired leakage with a seal (not shown) adapted in tensile strength to yield at a pre-selected pressure level to release gas from the cell. The seal can be reversible or irreversible.

Alternatively, outlet(s) 35 may always be open to the environment, in which case a reversible airtight seal to the interior of the cell is maintained by blocking the pressure release channel 36. In particular, the overpressure stop 32 can also function as a overpressure release control if it is formed of a suitably deformable plastic material such as rubber for sealing pressure release channel 36 and outlet(s) 35 (if not open to the environment). In addition to the deformable material shown, other structures for releaseably blocking the pressure release channel include, without limitation, a plug or a spring. When the internal cell pressure rises to a sufficiently high level, the block is urged away from channel 36 and from outlet(s) 35 to define a pressure release path from the cell interior to the outside environment. The pressure at which the vent system releases the cell internal pressure depends on how much internal pressure a battery can withstand; the plastic material of the overpressure stop 32 is selected to respond to a pressure at which venting is desired, but to remain securely in place at lower pressures. Generally speaking, for a metal hydride rechargeable cell, the safety vent system responds to cell internal pressures of about 600 psig and higher, more typically in the range of between about 1000 to 1200 psig.

The opening and closing of the pressure release path through channel 36 and outlet(s) 35 can be reversible but may also be made irreversible by employing a block made of materials that do not revert to a shape or size or position that can effectively block the pressure release path after a first pressure rise. It will be appreciated that blocks other than those disclosed herein can be employed in both reversible and irreversible vent systems, as will be described in more detail below.

Figure 3:
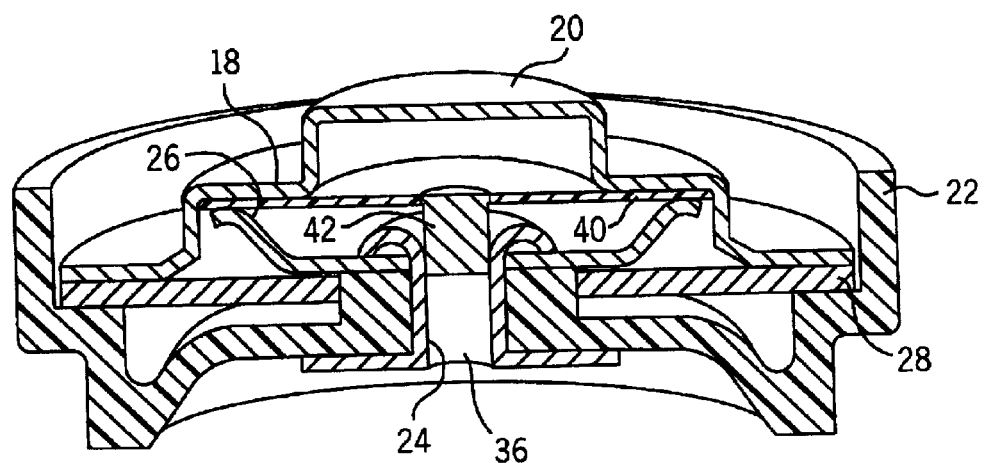
FIG. 3 is a cross-sectional isometric view of an end cap assembly containing a pressure-responsive switch and a pressure-release vent constructed in accordance with an alternate embodiment of the invention, depicted in a low pressure position.
Figure 5:
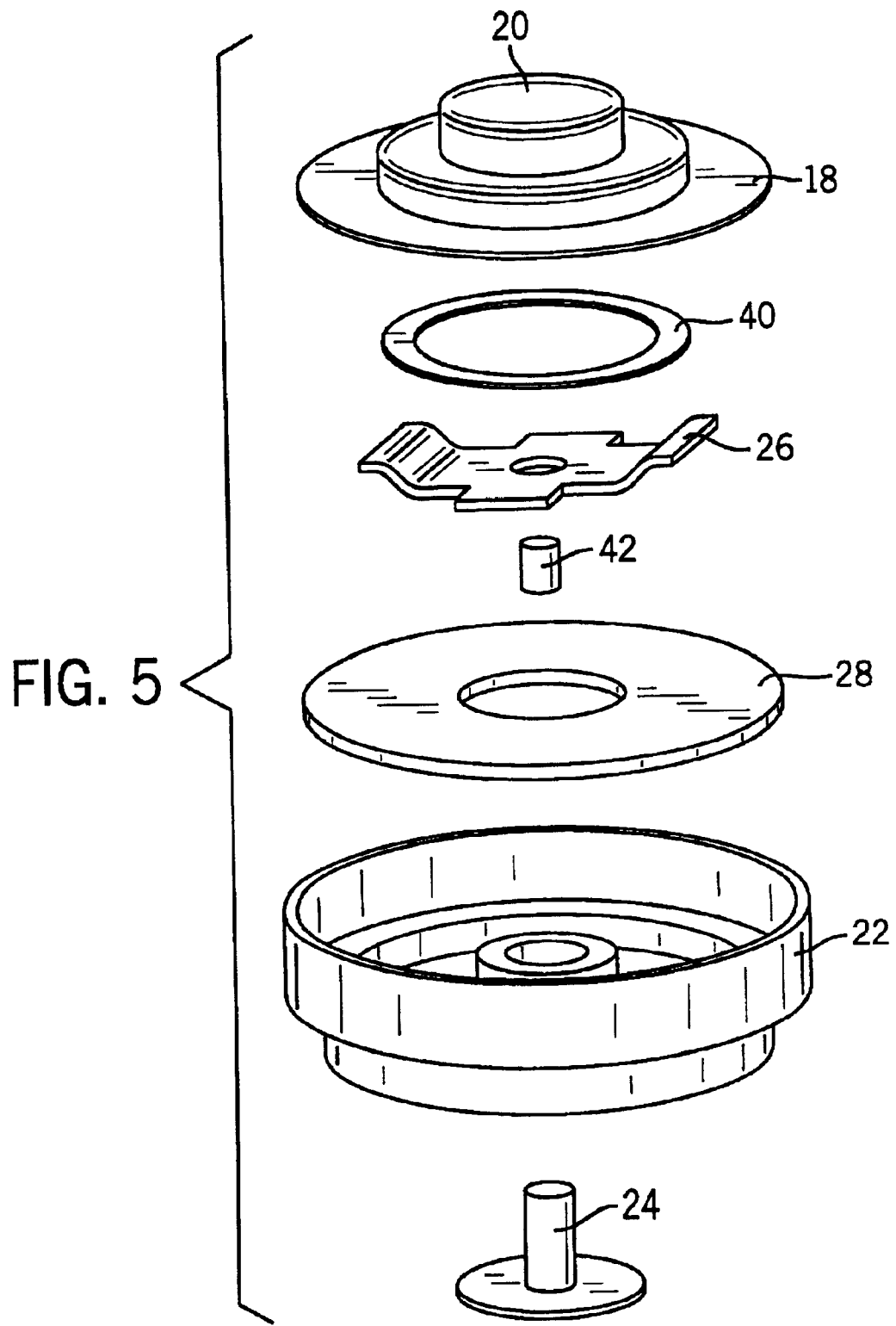
FIG. 5 depicts an exploded view of the components of the end cap assembly of FIG. 3.

Referring now to FIG. 3, one example of an end cap assembly having an irreversible vent is illustrated, in which like elements to those illustrated in FIGS. 2A and 2B are identified by the same reference numerals. FIG. 5 illustrates these elements prior to being assembled into the can 12.

In accordance with this embodiment, the first contact 26 is not flat, but rather includes a flat central portion and four arms, each arm having a distal portion and a transition portion that connects the distal and central portions, which are not coplanar with each other. The central portion is in electrical contact with the conductive connector 24 and the second contact 28. The second contact 28 is electrically connected to end cap 18. Each distal portion of contact 26 is electrically isolated from the end cap 18 by an electrical isolator 40 that is disposed therebetween and aligned with the distal portion of contact 26.

When internal pressure builds up within the cell, grommet 22 flexes, thereby removing contact 26 from electrical communication with washer 28. The electrical connection between terminal end cap 18 and the electrodes is also thereby removed. Insulator 40 limits the permissible axial movement of contact 26, and further prevents electrical communication between the distal ends of contact 26 and the end cap 18. The first contact 26 thus responds well in concert with the grommet 22 to changes in the internal cell pressure, and is well-suited to urging reversion of the switch to the low pressure position when internal pressure subsides.

Figure 4:
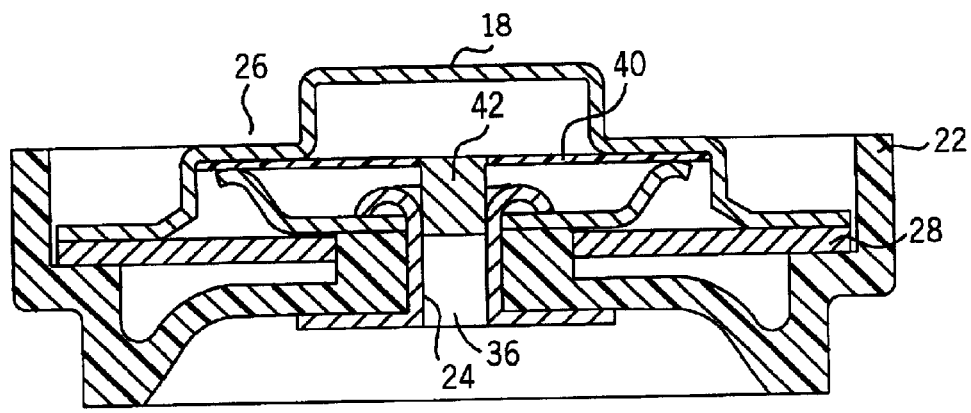
FIG. 4 is a cross-sectional elevation view of the end cap assembly of FIG. 3.

The venting system of FIGS. 3–5 is also configured somewhat differently than that of FIG. 2 in that the pressure release channel is plugged with an adhesively- or frictionally-engaged frustoconical plug 42 adapted to be expelled from the channel at high internal cell pressures, for example between 500–900 psig. Referring to FIG. 4, the insulator 40 may extend radially from terminal end cap 18 to plug 42.

During operation, when the electrical connection is broken between electrical contacts 26 and 28, current flow drops to zero. This zero current flow can be detected by conventional charger circuitry (not shown) and can be interpreted as a signal that the cell is fully charged. The charger circuitry can then signal the end of charge condition. These circuits are considered to be conventional. More importantly, only complete current flow drop needs to be detected, rather than any more subtle change in pressure, voltage, temperature or rate of current flow as is typical in conventional metal hydride recharging systems.

The internal cell pressure at which the pressure-responsive switch is biased from the low pressure position to the high pressure position (the "biasing pressure") can vary according to the size and shape of the battery, the charging rate and other charging conditions such as ambient temperature. For example, when the anode of a battery has a much higher capacity than the cathode of the battery, the cell internal pressure at a low overcharge rate may be stabilized at a relatively low level such as 30–50 psig. Similarly, the higher the charge rate, the higher the cell internal pressure will be when a battery approaches the full charge state or reaches an overcharge state. Thus, when a switch is built for a battery having a much higher capacity at the anode and/or when the battery will be charged at a very low rate, the biasing pressure of the pressure-responsive switch should be low enough to ensure that charge can be stopped when the battery reaches a full charge or overcharge state. On the contrary, when a switch is used in a battery that has similar anode and cathode capacities, or when the battery will be charged at a high rate, the biasing pressure can be set at any level that satisfies battery safety concerns since there is no question that the cell internal pressure can reach the biasing pressure.

Preferably, however, a pressure-responsive switch should have a switch pressure that is close to the internal pressure when the cell reaches the full charge state, to prevent problems such as overheating. One of ordinary skill in the art knows how to determine cell internal pressure at the point of full charge or overcharge. Generally speaking, for a fast nickel metal hydride rechargeable cell, a pressure-responsive switch may have a biasing pressure of between about 50 psig and 500 psig. It is preferable that the switch pressure is between 100 and 400 psig. It is most preferable that the switch pressure is between 200 and 300 psig.

Figure 6:
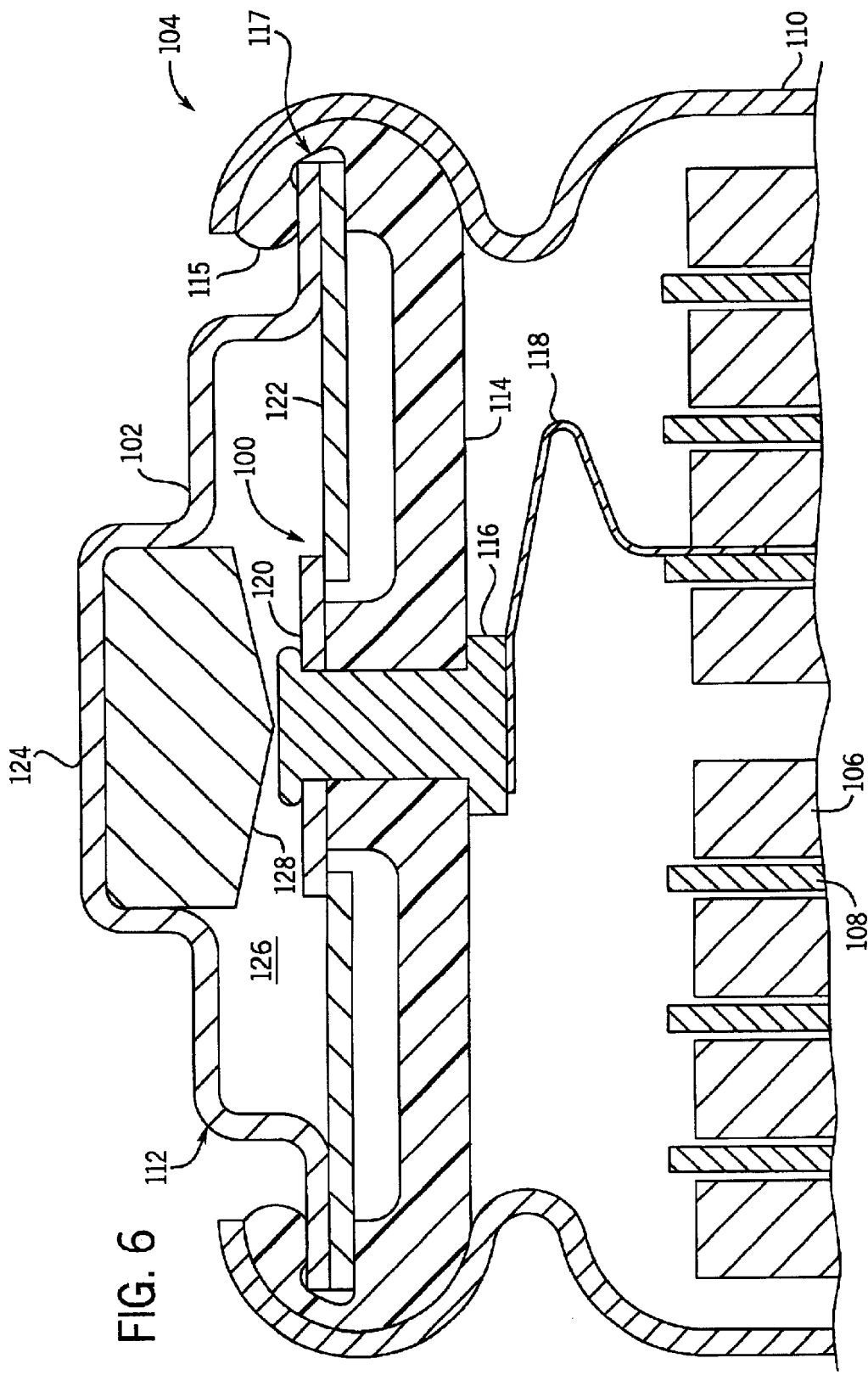
FIG. 6 is a sectional side elevation view of the positive terminal of a cell incorporating a switch constructed in accordance with an alternate embodiment of the invention.

Referring now to FIG. 6, a reversible pressure responsive switch 100 constructed in accordance with an alternate embodiment of the invention is disposed within a positive terminal cap 102 at the open end of a nickel rechargeable cell 104. The cell 104 may be conventional apart from the cap and its electrical connection to the cell electrodes. Cells made according to the present invention may comprise wound positive 106 and negative 108 electrodes in its interior, wherein the negative electrode (such as a hydride electrode) is in electrical connection with a can 110 having an open end and a closed end, and wherein the positive (e.g., nickel hydroxide) electrode is in electrical connection with the positive terminal cap 102 that is secured in the open end of the negative can 110. The cell contains an electrolyte, typically potassium hydroxide.

The open end of the cell 104 includes a cap assembly 112 constructed in accordance with the preferred embodiment, and disposed in the open end of the can 110. The open end of the negative can 110 is shaped to sealingly accommodate the cap assembly 112 in the open end during manufacture. The closed end of the cell can is not depicted but is conventional. The cap assembly 112 includes the positive terminal cap 102 and a pressure-responsive switch 100 constructed in accordance with the present invention.

The pressure-responsive switch 100 comprises a grommet 114 that provides both a flexible seal and main spring, and has a centrally disposed conductive connector 116, or "rivet" or "pin," extending axially there-through. The grommet 114 may be formed of any material that does not negatively interact with the chemistry of the cell but which is sufficiently flexible to move in response to a pressure increase to bias the switch of the invention, as described above. The grommet 114 further includes an outwardly and upwardly extending lip 115 that is shaped and sized to form a tight seal with the open end of the can 110 to separate the interior of the cell from the exterior. The lip creates a radially inwardly facing void 117 that is occupied by end cap assembly components, as will be described in more detail below. In the illustrated embodiment, the lip 115 has a convex outer surface to accommodate a concave inner surface of the can 110 that allows the can to be crimped into position during cell assembly. An optional sealant such as asphalt or tar can also be employed between the cap assembly 112 and the can 110 to further seal the open end.

Toward the interior of the cell, a conductive tab 118 electrically connects the central conductive pin 116 to the positive electrode 106. Toward the exterior of the cell, the central pin 116 is also in electrical contact with a contact ring 120 which also serves to secure the central pin into its position. Contact ring 120 is a washer that surrounds the central pin 116 and, along with contact plate 122, is disposed in an internal cavity 126 that is defined by the positive terminal cap 102 and the flexible grommet 114. Contact ring 120 is thus in constant electrical communication with the central pin 116. Secured in the void 117 are a circular conductive contact plate 122 and the positive terminal cap 102 having a nipple 124 sized and shaped to provide a standard positive terminal for the cell 104. The contact plate 122 is thus in electrical connection with both of the aforementioned positive end cap 102 and the contact ring 120 when the cell 104 is in the low-pressure state illustrated in FIG. 6. Accordingly, the nipple 124 is in electrical communication with the electrode 106 via end cap 102, contact plate 122, contact ring 120, central conductor 116, and tab 118.

In operation, the grommet 114 flexes outwardly in response to high internal cell pressure. When the internal cell pressure is sufficiently great to cause the grommet 114 to flex, the central pin 116 is urged toward the over-pressure stop 128, thereby biasing contact plate 120 axially away from contact plate 122 (not shown). The electrical connection between contact ring 120 and the contact plate 122 terminates, thereby terminating the electrical communication between the nipple 124 and electrode 106. Further charging is thus prevented. Advantageously, the switch 100 is reversible, in that the connection between contact ring 120 and contact plate is reestablished once the overpressure situation subsides. Also provided on an inner surface of the positive terminal cap nipple 124 in the cap assembly 112 cavity is a non-conductive over-pressure stop 128 which can also be used to pre-load the contact pressure as desired.

As described above, once the overpressure situation exists within the cell 104, the electrical contact is broken between contacts 120 and 122, current flow within the cell 104 drops to zero. This zero current flow can be detected by conventional charger circuitry and can be interpreted as a signal that the cell is fully charged. The charger circuitry can then signal the charge termination. These circuits are considered to be conventional. As was noted above, the rise in pressure, which follows gassing in the cell, precedes the damaging temperature rise that shortens cell cycle life.

Referring now to FIG. 7, a reversible pressure-responsive switch 150 is illustrated in accordance with an alternate embodiment of the invention. In particular, cell 154 comprises a negative can 152 having an open end that is shaped to accommodate and seal the cap assembly 172 in the open end during manufacture. The remainder of the cell can is conventional. The cap assembly 172 includes the positive terminal cap 156 having a nipple 157 that is sized and shaped to provide a positive terminal to the cell.

The regulating switch 150 illustrated in FIG. 7 includes a flexible grommet 158 adapted in size and shape to fit securely in the open end and having a central opening there through. A conductive connector 160 is securely fixed in the central opening such that the conductive connector moves in concert with the flexible grommet 152. A first conductive contact 162 surrounds the connector 160 and is in constant electrical communication therewith. A second conductive contact 164 extends radially inwardly from the radially outer wall of grommet 158 such that at least a portion of its upper surface is axially aligned and in severable contact with the lower surface of contact 162. A stop 166 is disposed axially downstream from contact 162, and limits the axial displacement of the grommet 158. An insulating layer 168 is disposed between contact 162 and the stop 166. Accordingly, the stop 166 does not form part of the electrical circuit.

The grommet 158 may be formed of any sufficiently flexible, nonconductive inert material that does not adversely impact the cell chemistry. Suitable materials include, but are not limited to polypropylene, polyolefin and nylon and their equivalents. Depending on the configuration of the switch elements, the switch 150 may be responsive to pressure, temperature, or both, as will become more apparent from the description below.

The terminal cap 156 and the flexible grommet 158 define a cavity 170 within the cap assembly 172 in which the first and second contacts 162 and 164, and stop 166 are provided. While the first and second contacts 162 and 164 are circular washers plates as illustrated in FIG. 7, they may be provided in other shapes and sizes, as described above. The second contact 164 includes three protrusions 174 proximal its radially inner edge that extend axially towards the first contact 162 and are spaced 120° from each other. When the internal pressure is less than a predetermined threshold, determined in large part by the flexibility of grommet 158, the protrusions 174 are in connection with the lower surface of the first contact 162, thereby completing the electrical circuit and permitting the cell to be charged.

Toward the interior of the cell, a conductive tab (not shown) electrically connects the central conductive pin 160 to the positive electrode in the manner described above. The hub of grommet 158 further serves to secure the central pin 160 in its proper position. Secured in the peripheral lip of the grommet 158 are the circular conductive contact plate 164 and positive terminal cap 156. The contact plate 164 is in electrical connection with both of the aforementioned positive end cap and the contact ring 162, although the latter connection is disconnected when the high temperature or pressure condition exists.

As described above, the end cap assembly 172 can also comprise a system for venting pressure from the cell. When the assembly comprises a vent system, the conductive connector 160 can define there through a pressure release channel for gas to flow from the cell interior on a first side of the flexible grommet 158 into the end cap assembly 172 on the second side similarly described in FIG. 3 and FIG. 4. The battery end cap 156 also defines one or more outlets 176 extending therethrough for gas to flow from the end cap assembly 172 to the outside environment. The vent mechanism (DELETE seal 4) can be reversible or irreversible. If the described vent system is not employed, other vent means can be provided.

In operation, the grommet 158, flexes (reversibly) axially downstream towards the positive end cap 156 and against the spring force of stop 166 in response to high internal cell pressure. The regulating switch 150 is thus biased from the closed position (illustrated in FIG. 7) to an open position (not shown), in which the central pin 160 moves axially downstream in concert with the grommet 158. Accordingly, the first electrical contact 162 becomes displaced from the second contact 164 and free from protrusion 174. The electrical contact between the contact ring 162 and the contact plate 164 is thus broken, and further charging is prevented, until the overpressure situation subsides and the grommet returns to the position illustrated in FIG. 7, and the electrical connection between contacts 162 and 164 is reestablished.

The stop 166 illustrated in FIG. 7 may further be manufactured from a temperature-responsive material that changes shape when a predefined temperature is attained. In this way, a stop can be fashioned to reversibly deflect or deform at a certain internal cell temperature, thereby reducing or removing the preload force on the central pin and reducing the pressure required to break electrical contact between the contact ring and the contact plate. In this way, a potentially harmful temperature rise is prevented, even if no overpressure condition exists within the cell. In operation, when the cell reaches a predefined temperature, the stop 166 can reversibly deflect or deform and pull the conductive connector 162 away from the contact plate 164, thus breaking electrical contact between the contact ring and the contact plate. Alternatively, the stop 166 can be connected to the conductive connector or central pin 160 and the top cap 156.

While any temperature-responsive material can be used, the stop is preferably formed from a bimetal composed of two layers of metals or alloys or other materials with different coefficients of thermal expansion. One layer has a higher thermal expansion and the other layer has a lower thermal expansion. This causes the bimetal to deflect or deform in response to temperature in a way that can be defined by the choice of metals or alloys used in each layer. Alternatively, a shape memory material can be used to form the temperature-responsive stop 166, such as a nickel-titanium alloy.

The temperature-responsive stop 166 can additionally operate as a pressure-responsive stop. Shape memory materials include alloys of Nickel-Titanium, Copper-Zinc-Aluminum, or Copper-Aluminum-Nickel. These materials are pre-formed to the concave disc shape 166 as shown to act as the spring and to apply a pre-determined amount force that will hold the conductive contact 162 and contact plate 164 together for electrical continuity. These materials have the ability to deform and flatten out when heated to a pre-determined temperature or become flatten out also when internal pressure reaches a pre-determined value. It has been found that the most desirable temperature range for these materials to work with nickel-metal hydride or nickel-cadmium cells is between 70 deg C. and 100 deg C.

It should be further appreciated that the stops illustrated in accordance with any of the previous embodiments may also be constructed to be responsive to temperature and/or pressure.

As described above, the charger may conclude that charging has terminated based on a zero current flow within the cell, or when charging time has reached a pre-determined value. The charger may then either discontinue the charge, or it could continue charging, in which case the pressure responsive switch will continue to open and close. The charging would therefore continue until a timer reaches a termination point at a pre-set value. This charging mode can be particularly advantageous when charging at a rate faster than 30 minutes, where pressure increases significantly when the cell is approaching a fully charge state, and the on-off of current provided by the pressure switching mechanism will continue to top up the charge to the maximum charge state. If the cell is being charged under constant voltage, constant current or alternating current at a very charge fast rate (charge termination within 30 minutes or less) the cell may be only charged to approximately 70–90%, as it is known that internal cell pressure increases ahead of a full cell charge during charging. The present inventors have determined that a constant voltage charge is more advantageous than a constant current or alternating when achieving a very fast charge rate (charge termination in 30 minutes or less), because charge current continues to decrease toward the end of charge with constant voltage, and as the result, pressure and temperature are not rising as quick in comparison to charging with a constant current. For example, up to 85–90% of charge can be achieved with constant voltage before the opening of the switch in comparison to 80–85% with alternating current and 65–70% with constant current. In some instances, the fast charging accomplished using the switch presented in accordance with the present invention offsets the disadvantage associated with the partial charging of the cell.

In other instances, it may be desirable to sacrifice time to ensure that the cell has become fully charged. In this instance, once the charger detects a zero-current, it waits until the internal pressure within the cell subsides and then measures the OCV for the cell (a pressure release vent would be particularly advantageous in such cells to minimize the cell depressurization time). Based on the OCV, the charger may determine whether the cell has been fully charged.

For example, it is known that a fully charged metal hydride cell will have an OCV of 1.42 V. Accordingly, if the OCV of the cell is being charged has exceeded a predetermined threshold of 1.42–1.48V, the charger would determine that the cell is fully charged. Otherwise, the charger will conclude that the cell has not yet been fully charged. Accordingly, once pressure within the cell has dissipated such that the electrical connection between contacts is established, the charger will again subject the cell to the alternating or constant current charge until the internal pressure within the cell breaks the electrical connection. This iterative process may continue until the cell reaches a predetermined OCV or a predetermined number of iterations, at which point the charger will provide an appropriate message to the user, for example by illuminating an indicator. Alternatively, the user could select a charge termination (e.g., 80% capacity), at which point the charger would calculate the corresponding OCV and terminate charging when the cell has reached the user-selected charge termination threshold.

This process would be more desirable when using constant current or alternating current charging, as pressure is known to build up significantly before the cell is fully charged. If a constant voltage charge is applied to the cell, it would be expected that the cell would be substantially fully charged after the first iteration, thereby allowing the charger to detect a zero current and indicate that the cell is fully charged. While the zero current flow method described above could also be used in combination with constant current and alternating current charging, the cell may not be fully charged when the first iteration terminates.

One advantage of the reversible switches illustrated and described in accordance with the present invention is that detection of charge termination is not dependent of oxygen recombination. Therefore, there is no longer any need to provide excess anode capacity. Oxygen at the cathode and hydrogen at the anode can be evolved. Both gasses contribute to the pressure. In this case, the anode capacity can be made equal to the cathode capacity, for a net increase in cell capacity. When charging current stops, oxygen recombines with hydrogen to form water: $1/2O_2+H_2 \rightarrow H_2O$.

Another advantage is that a non gas-permeable separator may be used. This eliminates the needs for having open flow channels within the separator for the gas to be recombined with anode, which had contributed to separator dry out and limited cell cycle life. With the pressure-responsive switch of the invention, additional electrolyte can fill in the channels. Therefore, cycle life and discharge efficiency would be increased.

Another advantage is that sophisticated analytical circuitry is not employed for detecting an end-of-charge condition, thereby reducing the cost of an associated charger device.

Another advantage is that charging can proceed at a faster rate than in prior cells. For example, a rechargeable metal hydride battery according to the invention can be charged in 45 minutes or less, preferably in 30 minutes or less, and most preferably in 20 minutes or less, even 10 to 15 minutes for a NiMH 1.3 Ah AA cell, whereas conventional cells require about 1 hour or more to charge (1.2 C). The charging rate can be accelerated because the invention eliminates the concerns about overpressure and high temperature conditions at the end of charging. In this regard, fast charging may be achieved at rate less than an hour.

Another advantage is that a cell of the present invention can have a higher capacity than a conventional rechargeable metal hydride battery. This is because a cell constructed in accordance with the present invention can have a greater balance of anode material to cathode material. Unlike prior art cells, in which the anode has an excess capacity of greater by 40–50% more than the cathode, a cell of the present invention can have a ratio of anywhere between 0.9:1–1.5:1 by weight of anode material to cathode material in accordance with the preferred embodiment.

Another advantage is that a gas impermeable separator may be implemented, which may be manufactured thinner and denser than the prior art, leaving more room for electrolyte within the cell. Cycle life is thereby increased, as is discharge efficiency.

In particular, oxygen at the cathode and hydrogen at the anode can be evolved during charging. Both gasses contribute to the pressure. In this case, the anode capacity can be made equal to the cathode capacity, for a net increase in cell capacity. When charging current stops, oxygen recombines with hydrogen to form water: $1/2O_2+H_2 \rightarrow H_2O$. Because, in such an embodiment, the separator may be gas impermeable, the limitation on electrolyte filling for preventing the separator to be totally saturated in prior art cells is eliminated.

Furthermore, whereas the cathode of prior art rechargeable metal hydride cells typically comprise type AB5 alloys, it also possible to employ the higher-capacity AB2 alloys that have traditionally been disfavored in such cells because of overpressure concerns.

The present invention further includes a method of charging a cell or a plurality of cells that contain the pressure-responsive switch of the present invention. The method comprises the steps of connecting the cell(s) to a power source, such as a dedicated charger, charging the cell(s) until the cell internal pressure reaches a predetermined level whereupon the switch is biased to the high-pressure position and the charging circuit is interrupted. When the charging circuit is interrupted, the drop in charging current to zero can be manually or automatically noted. A charger used to charge the battery can include circuitry for detecting zero charging current or a timer set to a pre-determined value or terminating, and an indicator for displaying that the charge has terminated. Alternatively, as described above, the charger could undergo a plurality of charging iterations to provide a fill charge to the cell.

While any type of method may be used to charge a cell incorporating a reversible switch in accordance with the present invention, a constant voltage charging method is preferred, since the current is allowed to seek its own decreasing level as charging proceeds without concern that the cell will be subject to overcharging or overpressure. With constant applied voltage charge method, as the cell voltage increases during charge, the current is automatically reduced toward the end of charge. Accordingly, the charging current is high at the beginning of charging when the cell's charge acceptance is high, and tapers to a lower charge current toward end of charge when the cell's charge acceptance is reduced. No expensive and complicated charging control is necessary. The current flowing into the cell is regulated by the cell internal resistance and the cell's own state of charge. When the cell reaches full charge, the increasing internal pressure will activate the pressure switch to interrupt charging. Accordingly, when the charger indicates that the charging has terminated, the cell will be at or near full charge.

Advantageously, strings of cells in parallel can be charged with the same voltage source. Multiple cells in series may also be charged together in accordance with the present invention by receiving the charging voltage that is equal to the open circuit voltage of the cell plus the over-voltage caused by cell internal resistance and the predisposed resistance of the circuit. Advantageously, with constant voltage charge, an even faster charge rate than that of constant current charge can be reached due to the ability to increase the charging current at the beginning of the charge when the cell can accept higher currents.

It should be appreciated, however, that the present invention is equally applicable to constant current and alternating current charges. As described above, it is known that the pressure inside metal hydride cells rises rapidly when cell charging is essentially complete. As was noted above, the rise in pressure, which follows gassing in the cell, precedes the damaging temperature rise that may shorten cell cycle life. Thus it is desired to terminate charging when the pressure begins to rise and prior to onset of a destructive overpressure condition.

EXAMPLES

For a nickel metal hydride cell to be charged in 15 minutes or less, the preferred constant charging voltage is about 1.6V to 1.65V for a AA cell with 30–40 mOhm internal resistance determined by voltage difference between cell OCV cell voltage at 6 seconds interval at 10 amperes current. For cell with lower internal resistance (C-size cells, for example, having internal resistance of 10–20 mOhms), charging voltage lower than 1.6V but higher than 1.5V can be applied. The inventors have determined empirically that constant voltage charging is preferred when the ambient temperature is above freezing while constant current charging is preferred when the ambient temperature is below freezing.

Commercial AA and AAA nickel metal hydride cells containing a pressure-responsive switch in the end cap assembly were fully charged in 15 to 30 minutes and charging was terminated when the pressure-responsive switched was biased into the high pressure condition. The pressure signal was consistent and reproducible even with extended cycling. Constant voltage charging method was shown to be more favorable when ambient temperature is above freezing. Constant current method is more effective when ambient temperature is below freezing. The slope of pressure rise and fall of AA NiMH consumer cells remained relatively constant during the course of cycling. The current-tapering effect when using constant voltage resulted in a lower pressure rise over time for the cell to become fully charged. The drop in current also produced lower temperature rise for the same charging period. Charging was demonstrated to be faster at higher voltages, although a higher cell temperature was also noted under such conditions.

As described above, it is known that the pressure inside metal hydride cells rises rapidly when cell charging is essentially complete. In particular, the rise in pressure, which follows gassing in the cell, precedes the damaging temperature rise that shortens cell cycle life. Thus it is desired to charge the cells in a manner that reduces the possibility of a destructive overpressure or overheating condition.

A constant current charging method or a constant voltage charging method or a combination method, for example, constant current followed by constant voltage, can be employed in accordance with the present invention. An alternating current charging method can be preferred, since the current is modulated, thus reducing the chance of overcharging, overpressure or overheating. No expensive and complicated charging control electronic circuitry is necessary.

The nature of the alternating current or voltage waveform is typically, but not exclusively, sinusoidal. Full or half wave rectification may be applied to the alternating current or voltage waveform.

FIG. 8 illustrates the cell pressure and temperature for a 1600 mAh nickel metal hydride cell charged using an alternating current derived from common 60 Hz line power that was full wave rectified to yield a 120 Hz alternating current frequency. The change in cell pressure and temperature are lower at the end of charge compared with a constant, or direct, current charge.

Figure 9:
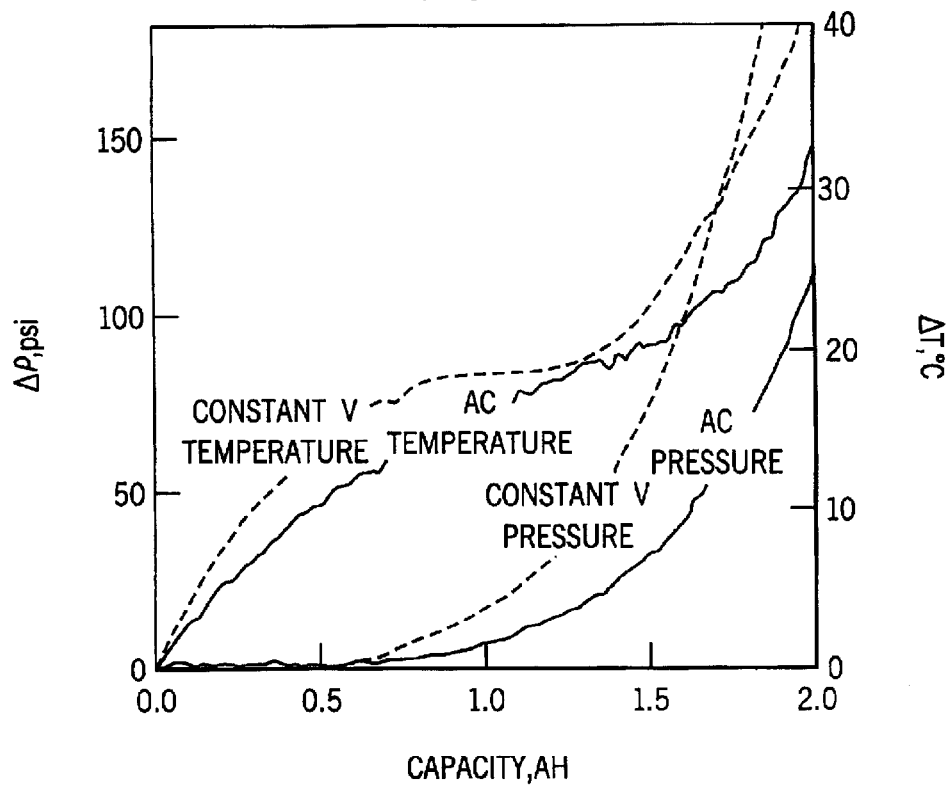
FIG. 9 is a graph plotting capacity (Ah) vs. ΔP (psig) for a nickel metal hydride cell during alternating current and constant voltage charge.

FIG. 9 shows the cell pressure and temperature for a 1600 mAh nickel metal hydride cell charged using an alternating current as in FIG. 8. The change in cell pressure and temperature are lower at the end of charge compared with a constant, or direct, voltage charge.

The examples illustrated herein utilize a full wave rectified current derived from common 60 Hz line power. Other embodiments encompassed by the present disclosure include full wave rectified alternating voltage or half wave rectified sinusoidal alternating current or voltage. Another embodiment is an alternating current or voltage charge of any frequency. Another embodiment is an alternating current or voltage comprised of any waveform, including square wave, triangle wave (or sawtooth wave), or any arbitrary waveform or combination of waveforms. Another embodiment is the combination of rectified and unrectified alternating current or voltage composed of any frequency or combination of frequencies, or any waveform or combination of waveforms. Advantageously, any of these charging methods may be utilized by a cell having a pressure-responsive switch as described above.

Figure 10:
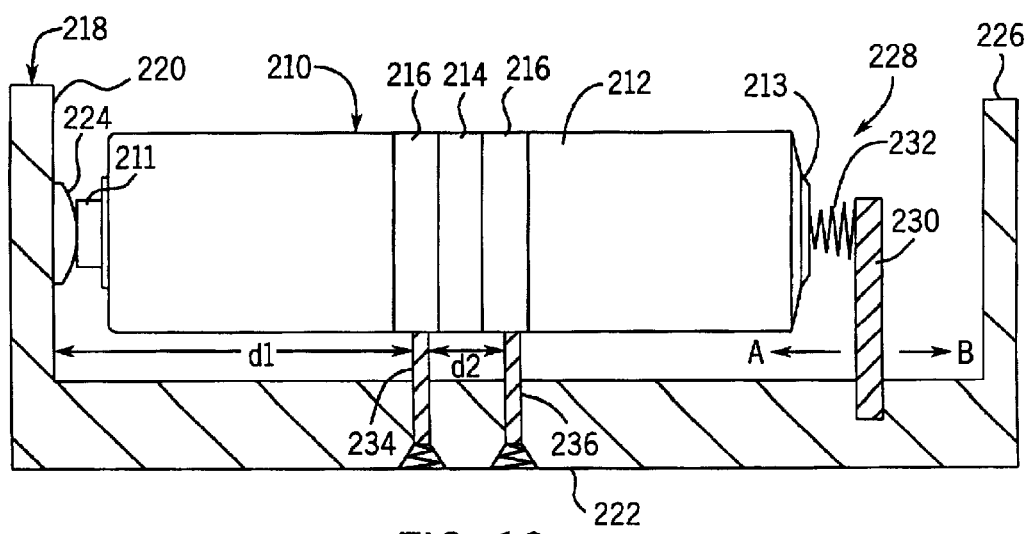
FIG. 10 is a schematic sectional side elevation view of a battery charging assembly constructed in accordance with the preferred embodiment including a cell having a strain gauge assembly.

Referring now to FIG. 10, an apparatus for determining a charge terminating point is illustrated in accordance with an alternate embodiment of the invention. In particular, a conventional rechargeable AA battery 210 has a positive terminal end 211 and a negative terminal end 213. While the battery 210 has a nickel-metal hydride cell in accordance with the preferred embodiment, it should be apparent to one having ordinary skill in the art that any nickel-based rechargeable cell of any suitable size could be used in accordance with the present invention. The battery has been modified to include a label 212 wrapped around the outer surface thereof having an integral metallic film strain gauge 214, which comprises constantan in accordance with the preferred embodiment. The ends of the gauge 214 terminate at both ends with a corresponding pair of contact bands 216 which also wrap around the cell and are conductive and in electrical communication with both ends, respectively, of the strain gauge so as to allow the resistance of strain gauge to be measured, as will be described in more detail below.

Figure 14:
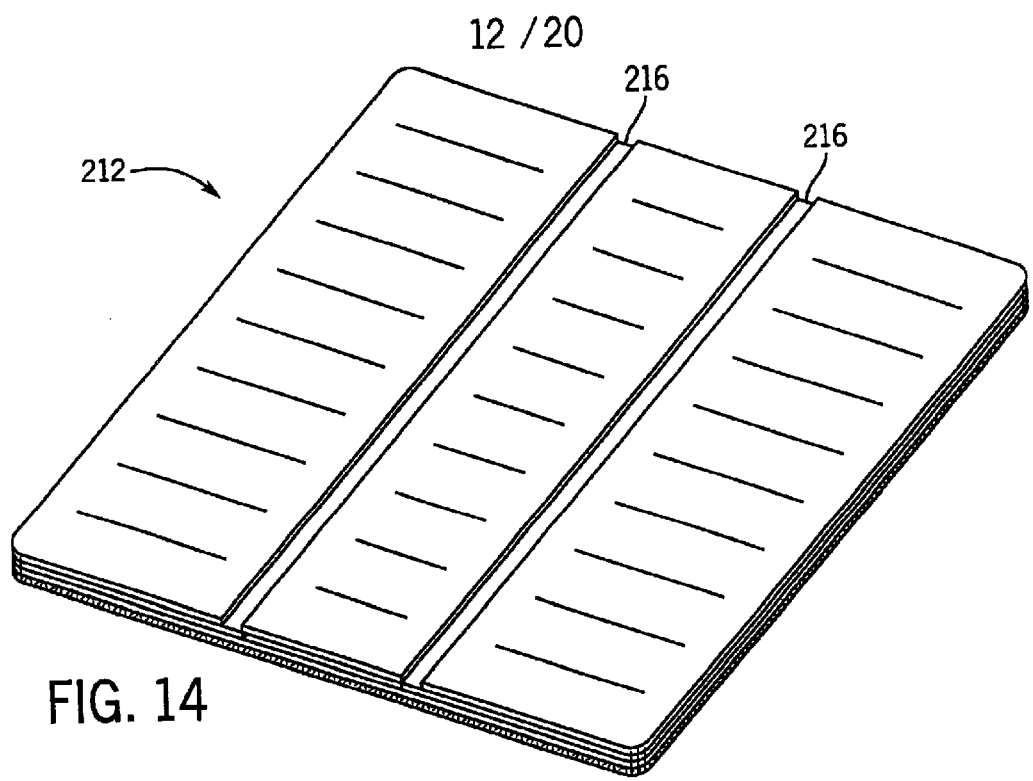
FIG. 14 is a perspective view of the label for the battery illustrated in FIG. 10.
Figure 16:
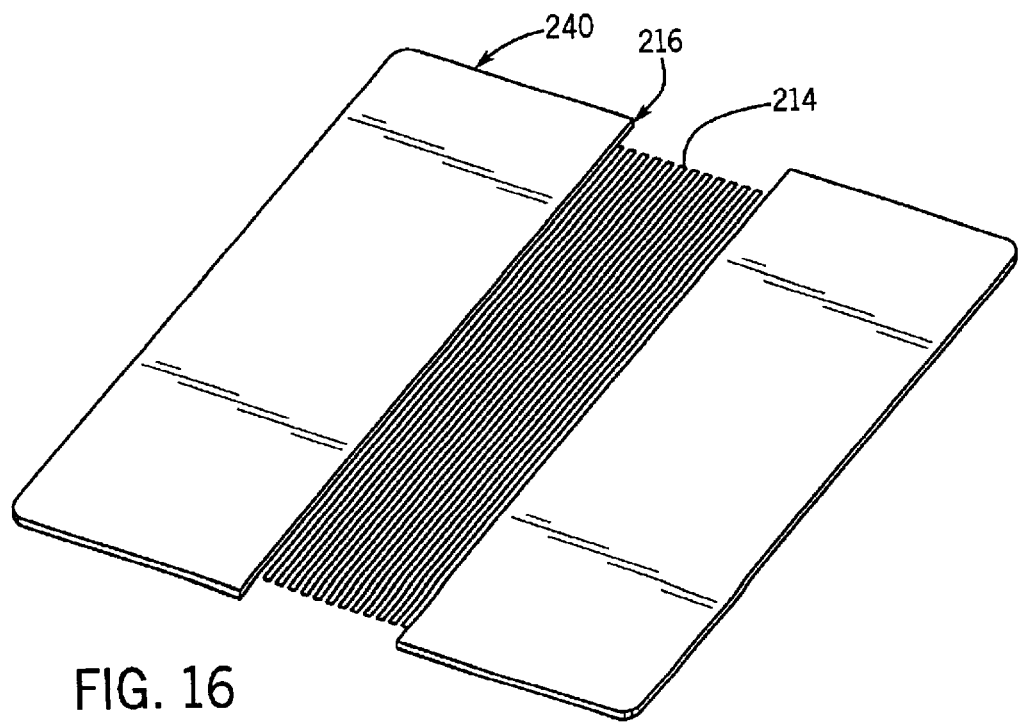
FIG. 16 is a perspective view of the metal film layer of the label illustrated in FIG. 10.

Referring now also to FIGS. 14–16, the label 212 is a laminate comprising, beginning at its radially inner surface, an adhesive layer 244, followed by an insulating layer 242, the metal layer 240 having metal film 214 arranged in a "serpentine" configuration and the pair of contact bands 216 positioned on either side of the film 214, and finally an outer insulating layer 238 having graphics applied to its outer surface. The outer insulating layer contains a pair of apertures 239 extending there-through aligned with the at least a portion of the pair of contact bands 216 such that the bands remain exposed and accessible to contacts 234 and 236 in the charger 218, as will be described below. The label 212 is then wrapped around battery 210 such that the film 214 provides a strain gauge that indicates expansion of the outer surface of the battery, as will be described in more detail below. The metal film 214 could alternatively be configured in a helical arrangement, though this would require the film layer 240 to be wrapped several times around the battery 210, adding cost and complexity to the fabrication process.

Battery 210 is thus operable to be placed in a conventional battery charger 218 that is configured to receive multiple batteries having various sizes. In particular, a first wall 220 extends vertically from base 222 of charger 218 and has a positive contact 224. A second wall 226 extends vertically from the opposite side of base 222, and defines a battery enclosure 228. A slideable wall 230 has a negative spring contact 232, so as to enable a recharging current to flow through battery 210. In accordance with the preferred embodiment, charger 218 supplies a constant current to battery 210, though it is appreciated that constant voltage charges are also available and compatible with the present invention.

In order to accommodate batteries having various sizes, wall 230 is slide-able along a guide rail (not shown) in the direction of arrows A and B to accommodate batteries having reduced and greater lengths, respectively. A pair of contacts 234 and 236 extend upwardly from base 222 and are spring-mounted so as to engage the contact bands 216 of battery 210 regardless of the radial orientation of the battery within the charger 218. Contacts 234 and 236 are further electrically connected to control circuitry or a microprocessor or the like (not shown) in charger 218 that is programmed to determine the charge termination point, as will be described in more detail below.

Contacts 234 and 236 are additionally displaced from positive terminal end 211 by a predetermined distance D1, and contact 236 is displaced from contact 234 by a predetermined distance D2. Accordingly, the bands 216 are also manufactured so as to be displaced from the positive terminal 224 by D1 and D2, respectively regardless of the size of the battery. As a result, the contacts 234 and 236 will be axially aligned with the bands 216 of a battery, regardless of its size. Furthermore, because the contacts 234 and 236 are displaceable in the radial direction under spring force, they may engage any size cylindrical cell including, but not limited to, sizes AAA, C, and D cells. The present invention envisions that positive contact 224 could alternatively be slide-able, and the bands 216 and contacts 234 and 236 be positioned at a predetermined distance from negative contact 232. The charger could further be configured to accept the terminal ends of a 9-volt battery, as would be appreciated by those having ordinary skill in the art.

While the rates of change in voltage and temperature have been used in accordance with conventional charge termination systems, and are theoretically usable to provide a charge termination point, these values change slowly are lag behind the actual charging of the battery. Accordingly, these prior art systems risk overcharging the cell, thus causing potential hazards, unless the battery is charged at a slow rate, which is undesirable to the end user.

Because a rechargeable cell accumulates pressure during charging, the outer surface of the battery consequently expands, thereby also expanding strain gauge 214 and varying its resistance. The temperature of battery 210 also increases during charging, which causes further expansion of the outer surface of the battery, thereby further affecting the resistance of strain gauge 214. Furthermore, the rates of change in temperature and pressure within the cell 210, and thus the resistance of gauge 214, vary as a function of time in a predictable manner as the battery approaches its charge termination point. In accordance with the preferred embodiment, the rate of change of resistance of strain gauge 214 (dR/dt) is measured by the processor to provide an indication of the charge termination point. The rate of expansion of the outer wall of battery 210 is thus used to determine the charge termination point. The following equations are used to relate a change in resistance $\Delta R$ to the change in pressure $\Delta P$ and change in temperature $\Delta T$:

$$\Delta D/D = D \Delta P / 2tE \quad (1)$$

$$\Delta R/R = k_g(k_t \Delta T + D \Delta P / 2tE) \quad (2)$$

where $k_g$ is the gauge factor, T is temperature, $k_t$ is the thermal expansion coefficient of the can material, D is the cell diameter prior to charging, E is Young's Modulus of the can material, P is the internal pressure of battery 210, and t is the thickness of the outer wall of the can prior to charging. The derivation of Equation 2 with respect to time produces:

$$\frac{dR}{dt} = Rk_g k_t \frac{dT}{dt} + \frac{Rk_g D}{2tE} \frac{dP}{dt} \quad (3)$$

Because of the state of charge of a given cell is not known when the cell is initially placed into the charger 218, and since the nominal resistance of the particular strain gauge 214 on a given cell is not known, detecting an absolute value of pressure or temperature would not be possible with this method. However, the rates of change of pressure, temperature, and resistance are measurable and behave in a predictable manner, and thus may be used as a criteria for determining the charge termination point. Although the gauge 214 is sensitive to both pressure and temperature, the contribution from the rate of change of pressure is significantly greater than that of temperature towards the end of the charging period, and thus will dominate. As a result, the slow reaction of the rate of temperature change will not adversely affect the determination of the charge termination point. If it is desired to determine the charge termination point for a plurality of batteries wired in series, the contact bands 216, and thus the strain gauges 214, may also be wired in series and the total rate of change of the desired parameter (either pressure or resistance) may be determined.

The resistance R of strain gauge 214 may be determined by supplying an electrical current to contact bands 216, and measuring the drop in voltage across strain gauge 214. Alternatively, and as is appreciated by those having ordinary skill in the art, a bridge circuit may be used to amplify the signal changes from strain gauge 214. The resistance is constantly sampled during charging until its the rate of change meets a predetermined threshold criteria, thus indicating the charge termination point. At this time, an indicator on charger 218 (not shown) may be activated to alert a user, and the charger will be discontinue its charging current from the battery 210. Accordingly, a reliable indicator is provided for indicating a charge termination point for fast charging assemblies, which may fully charge a depleted battery in less than 230 minutes.

The present invention takes advantage of the inherent responses of conventional batteries during charging. As a result, label 212 may be advantageously applied to any pre-existing conventional nickel-based (or equivalent) rechargeable battery in the manner described above to render it compatible with the present invention.

It should further be appreciated that the present invention may be implemented in recharging battery packs, such as a cellular phone and the like. These battery packs would include a plurality of cells connected in series having a plurality of strain gauges corresponding to each cell and also connected in series to an additional contact on the battery pack for electrical communication with control circuitry in the charger to determine the rates of change in pressure, temperature, and resistance, as described above. Alternatively, the cells could be placed in a charger, and connected in parallel during charging, as described above with respect to the pressure switch.

In order to empirically determine the charge termination point of a size AA battery based on the rates of change in resistance and/or pressure, a nickel-metal hydride AA cell was tested. The empirical results that will now be described could then used to program the control circuitry in charger 218 to determine the charge termination point of a given cell. It should be appreciated that the following is merely an example of one specific cell, and that results may vary from one cell to the other. Accordingly, the present invention is in no way to be limited to the results illustrated below. Rather, the results are described below to demonstrate the rate of change of resistance and/or pressure that correspond to the charge termination point of a given cell, which may then be used to program control circuitry of the charger 218 in accordance with the preferred embodiment.

The test battery was placed in a laboratory battery charger and was subjected to a constant recharging current. The charge time, current, and voltage were measured along with the pressure and temperature within the cell, using corresponding pressure and temperature gauges. Using Equations 1–3, various values were calculated, such as: dP/dt; dT/dt; $R*k_g*(D/2Et)*dP/dt$; $R*k_g*k_t*dT/dt$; and dR/dt.

Figure 11:
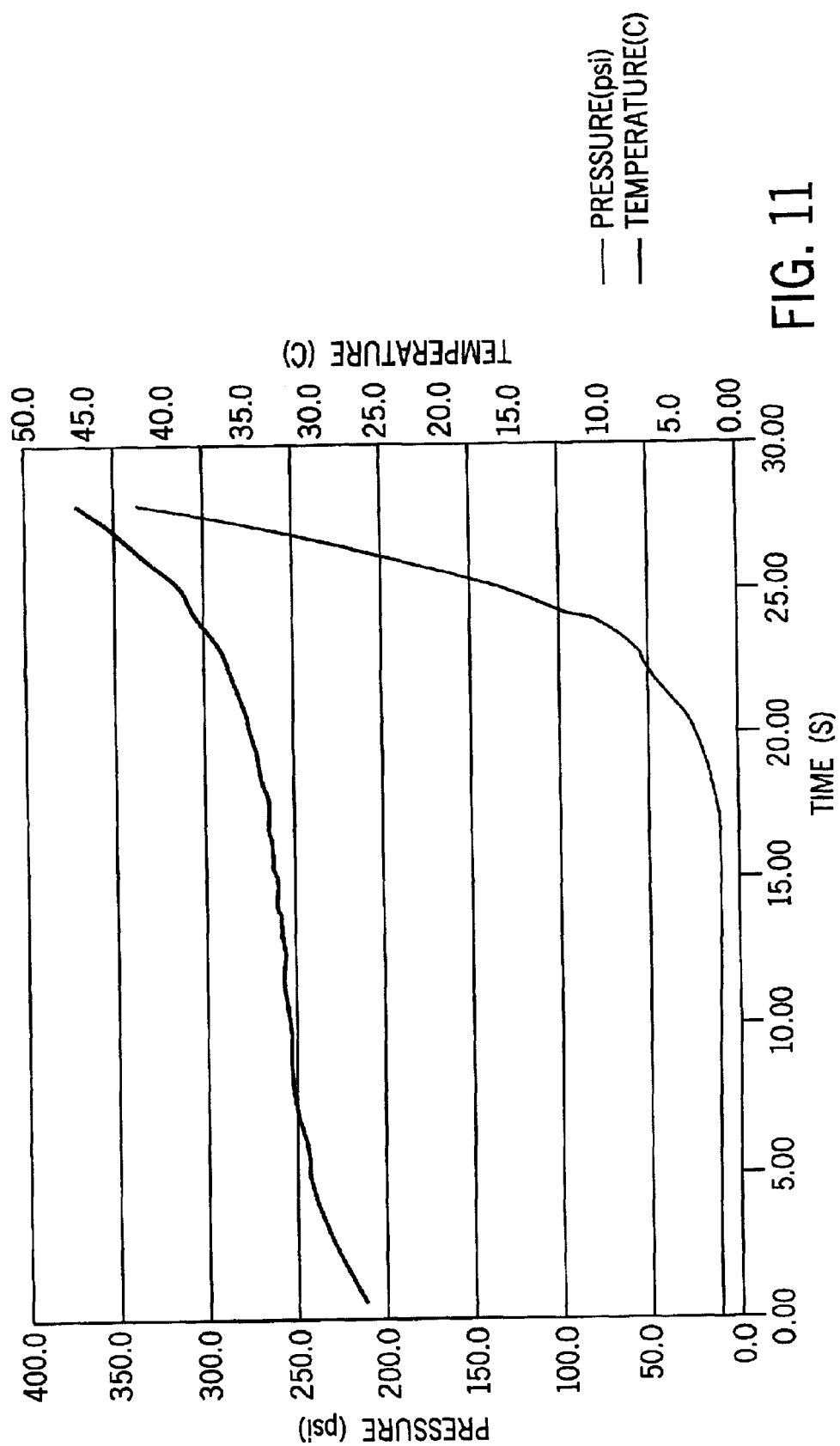
FIG. 11 is a graph plotting pressure and temperature vs. time obtained during the charging of a AA size nickel-metal hydride cell.
Figure 12:
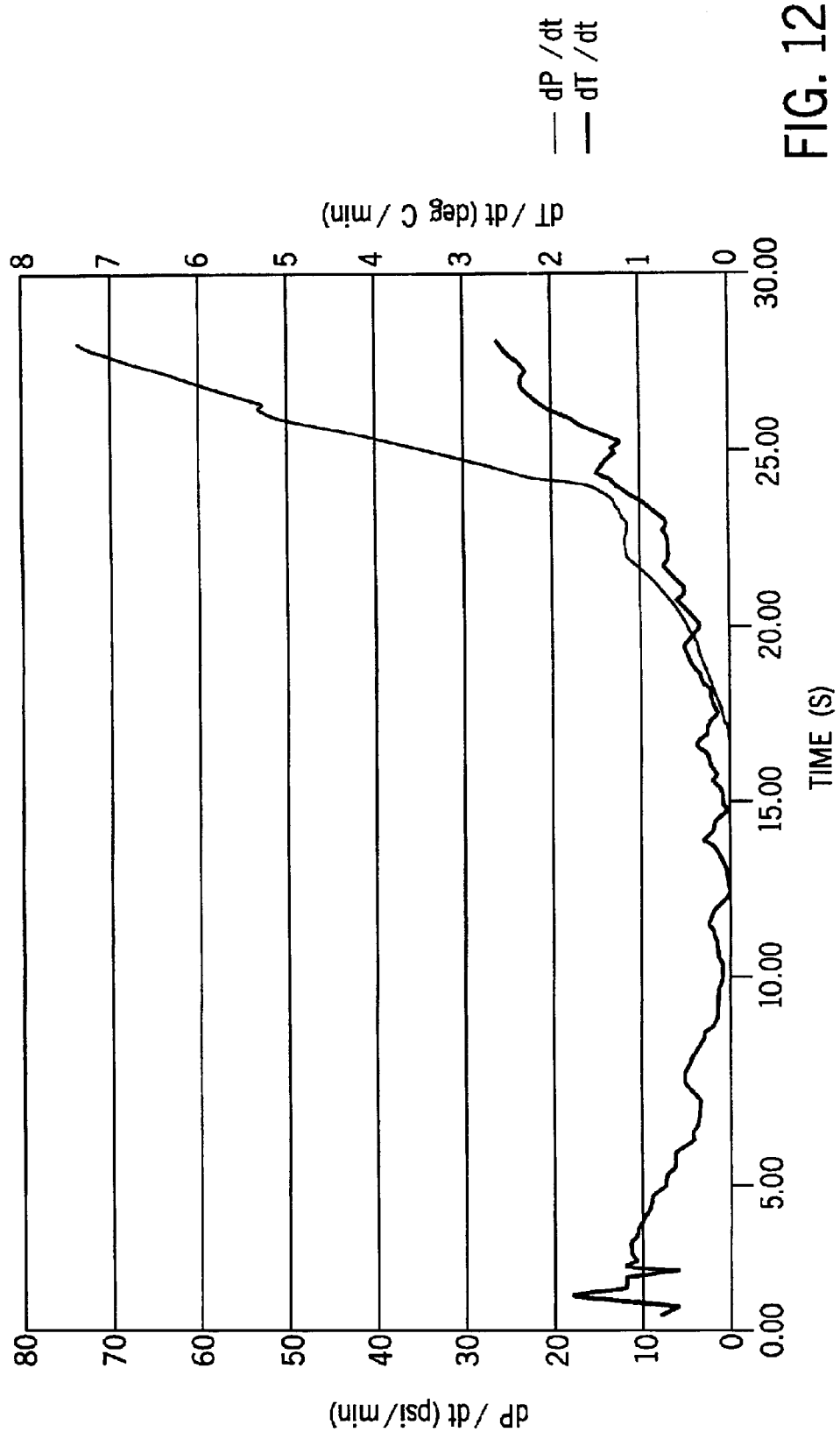
FIG. 12 is a graph plotting dP/dt and dT/dt vs. time during the charging of a nickel-metal hydride cell.
Figure 13:
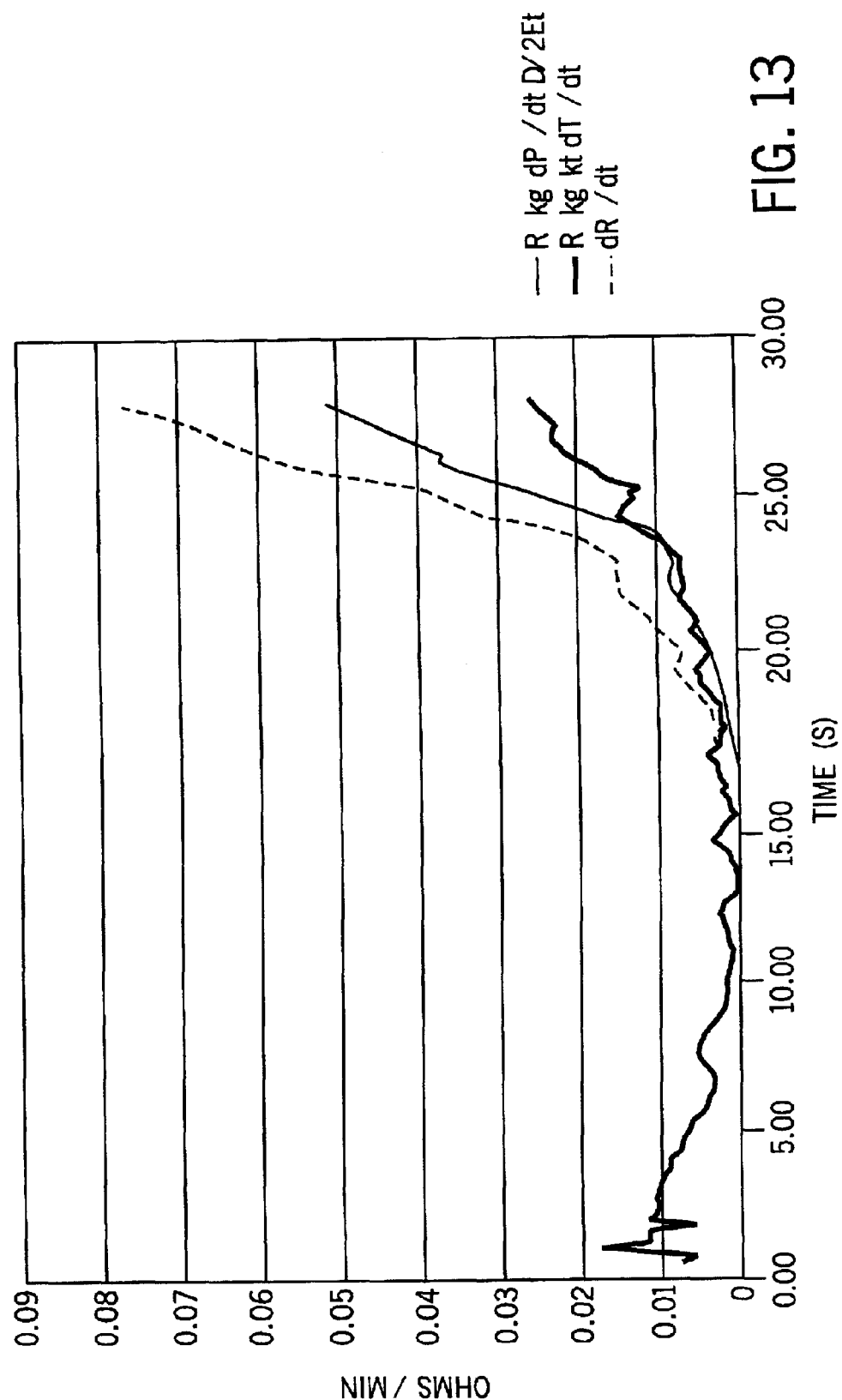
FIG. 13 is a graph plotting dR/dt and its components vs. time during the charging a nickel-metal hydride cell.

The charge termination point of the battery was known based on the pressure of the cell, at which point the values of Equation 3 were determined to correspondingly provide threshold rate values when charging a similar AA cell. It is appreciated that varying cells having varying remaining charges at the commencement of charging will also have varying charge times. However, the behavior associated with the rate of change of pressure, resistance, and temperature over time will remain predictable among a plurality of cells. The results are plotted in FIGS. 11–13.

In this example, the values of R and $k_g$ were selected to correlate with a typical commercially available strain gage. It was then was determined that a threshold value of dR/dt= 0.055 ohms per minute corresponded to the charge termination point. A threshold value of dP/dt=55 PSI/min also corresponded with the charge termination point.

Accordingly, these values may be programmed into control circuitry in charger 218, which would then be able to identify the charge termination point of battery 210 either by (1) measuring dR/dt directly and comparing it to a threshold value, or (2) measuring dR/dt along with dT/dt (using a temperature sensor in charger 218 that is in thermal communication with the battery being charged) to correspondingly calculate dP/dt, and compare that value to a predetermined threshold. The thermocouple in the charger is in close proximity to the cell. It should be appreciated that a thermocouple could be individually associated with each cell being charged or, alternatively, a single thermocouple could be used to provide an adequate approximation of each cell.

Referring now to FIG. 17, cell internal pressure vs. time is illustrated for a group of four 1600 mAh Nickel Metal hydride cells being charged with a constant voltage at 1.65V. The internal pressure rises to 300 psig as the cells reach full charge in 12 minutes. The pressure returns to the initial state following discharge of the cells. This demonstrates that the internal pressure of Nickel Metal Hydride cell rises and falls in a predictable manner, which can be use as a reliable signal to terminate charge under very high rate of charge. Groups of cells can thus be charged and discharged reliably with pressure as charge termination signal.

Figure 18:
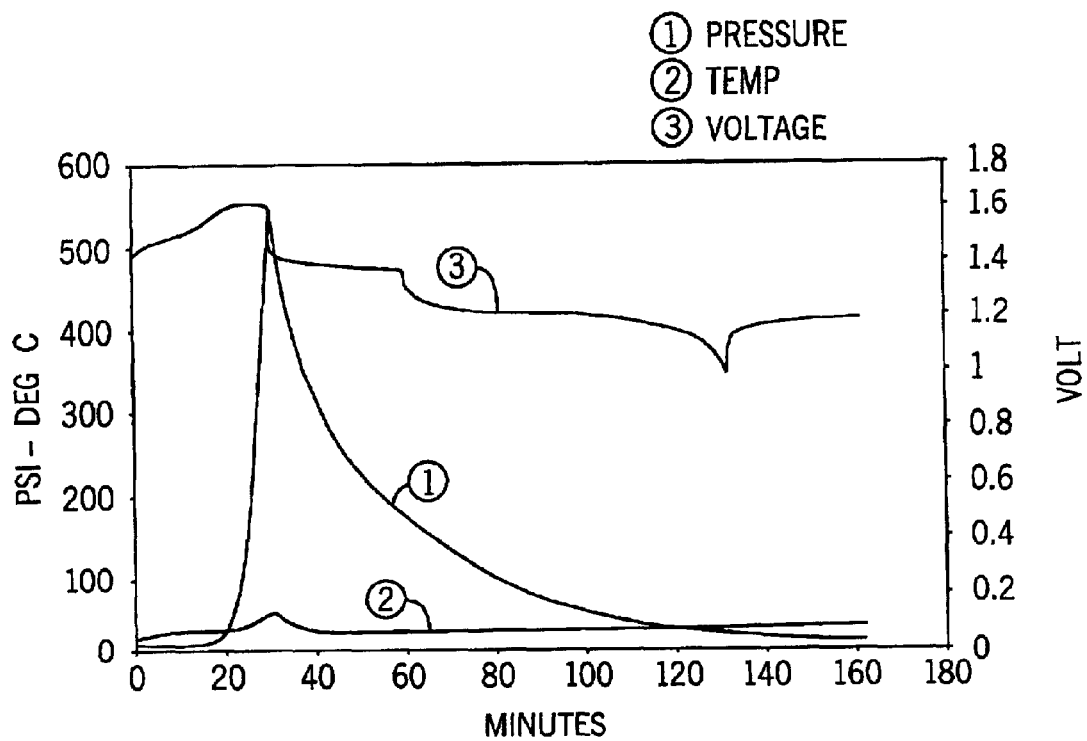
FIG. 18 is a graph plotting pressure, temperature, and voltage vs. time (min) for a cell during charging using a constant current charge, and subsequent discharging.

Referring now to FIG. 18, typical charging and discharging characteristics of a 1300 mAh NiMH cell were measured under a constant current charge of 3A followed by a 1A discharge to 1V. The pressure, temperature, and voltage were measured, and plotted vs. time. This illustrates that pressure is a much stronger signal for charge termination than temperature and voltage. Pressure rises at much faster rate than temperature and voltage, therefore pressure is a more suitable signal than temperature and voltage for charge termination.

Figure 19:
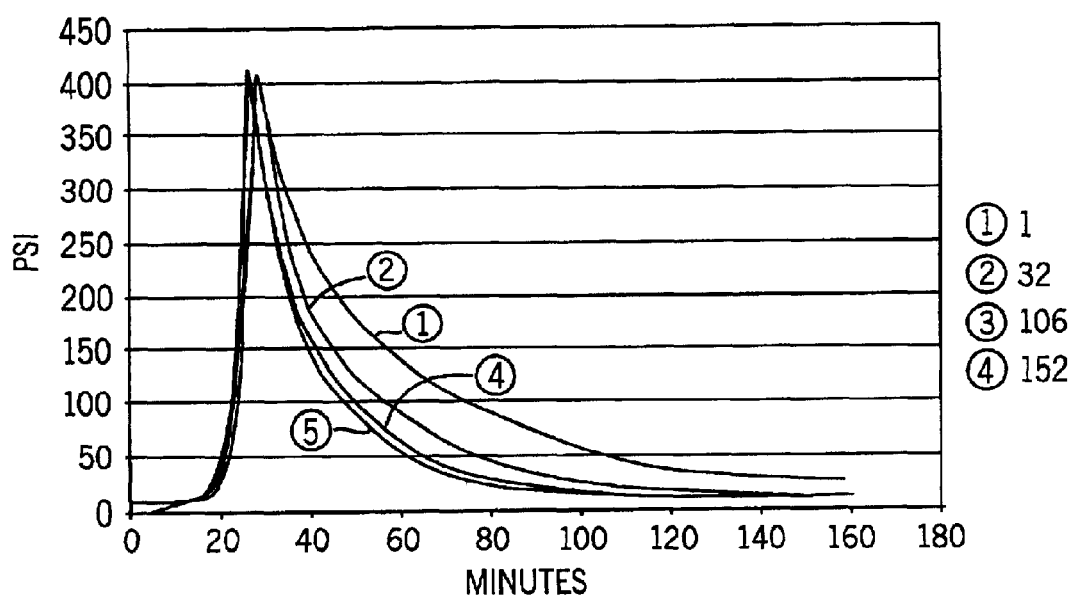
FIG. 19 is a graph plotting internal pressure (psig) vs. time (min) for various cycles during charging using a constant current charge, and subsequent discharging.
Figure 20:
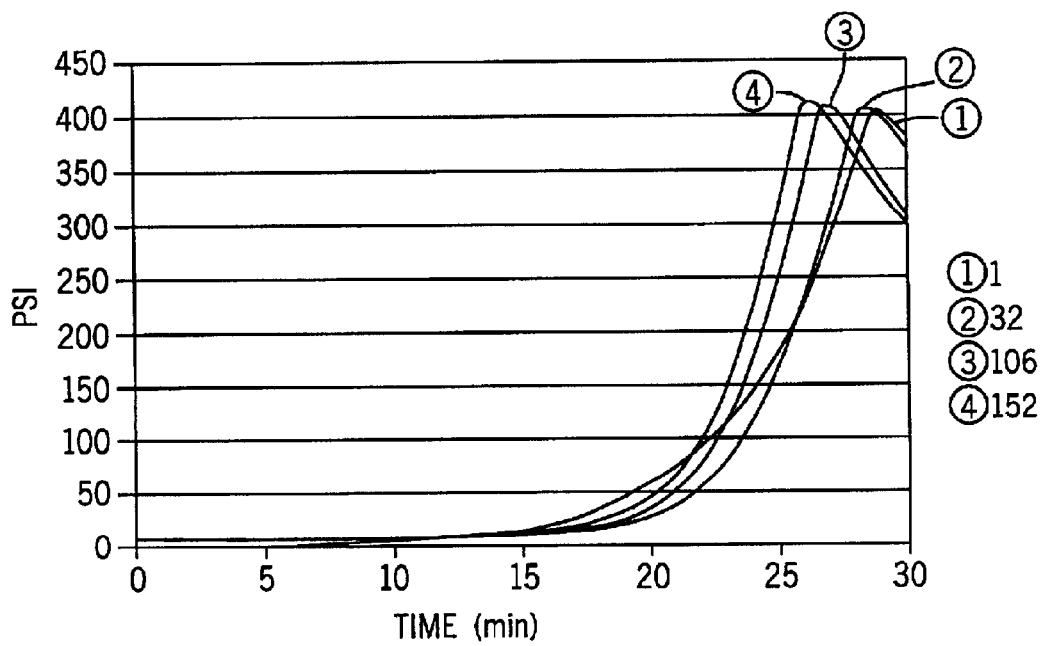
FIG. 20 is a graph plotting the pressure rise for the cell illustrated in FIG. 19 during charging.
Figure 21:
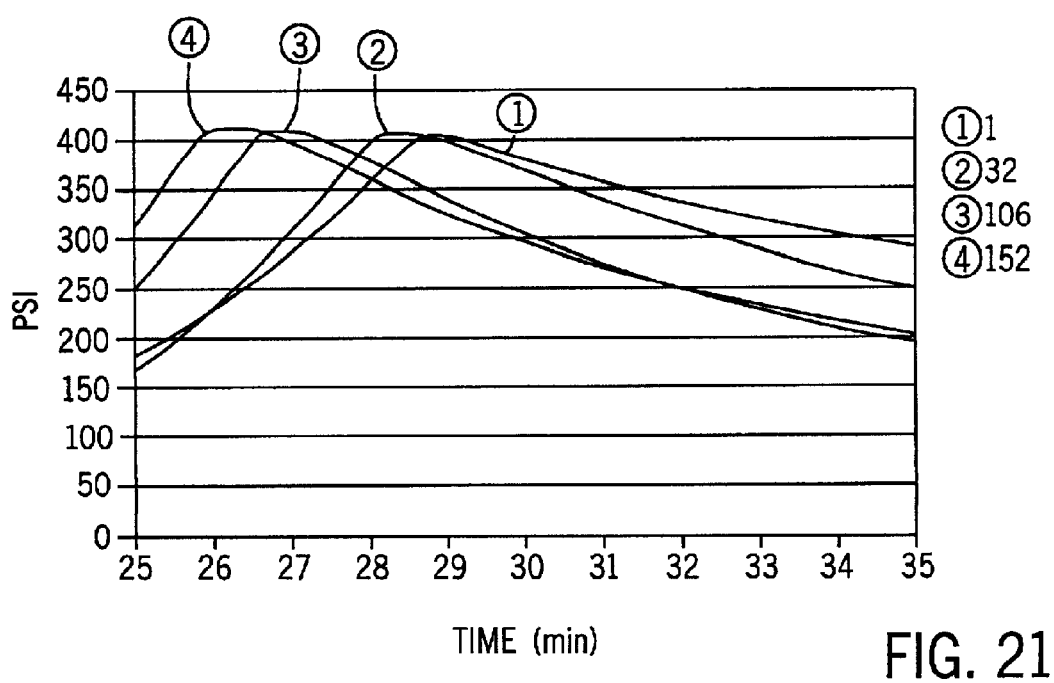
FIG. 21 is a graph plotting pressure fall for the cell illustrated in FIG. 19 during discharging.
Figure 22:
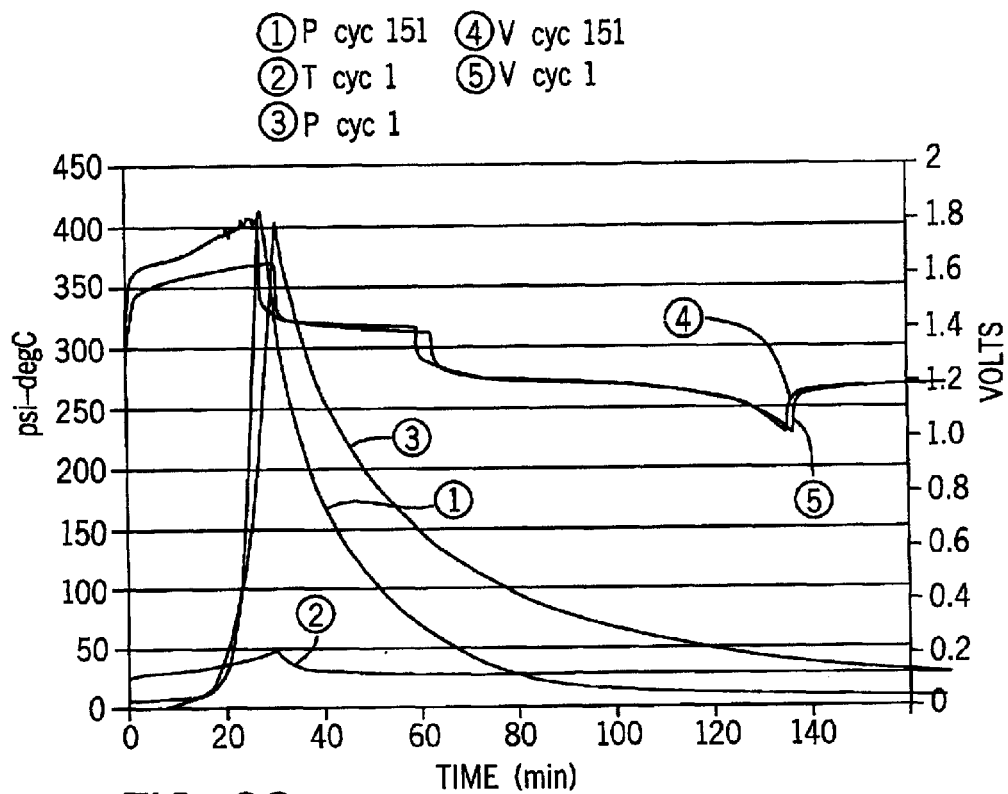
FIG. 22 is a graph plotting pressure and temperature vs. time for cells at different cycles under a constant current charge.

Referring now to FIGS. 19–21, the slope of pressure rise and fall remained relatively constant during the course of cycling in comparison to the voltage illustrated in FIG. 22. This further indicates the reliability of pressure as an indicia for the charge termination point of a cell.

Figure 23:
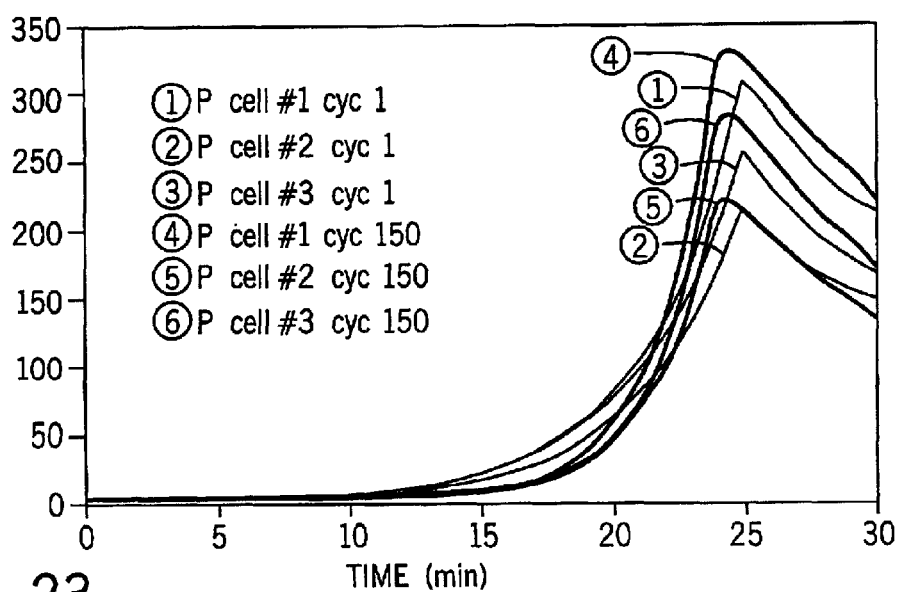
FIG. 23 is a graph plotting pressure vs. time for a plurality of cells at different cycles under a constant current charge.

Referring to FIG. 23, three 1600 mAh Nickel Metal hydride cells were subjected to a 3.7A constant current charge and discharge for 150 times. The internal pressure of the cells was shown at cycle 1, and at cycle 150, and plotted vs. time. This further illustrated that pressure signal is reproducible with cycle life and different cell size and capacity.

Figure 24:
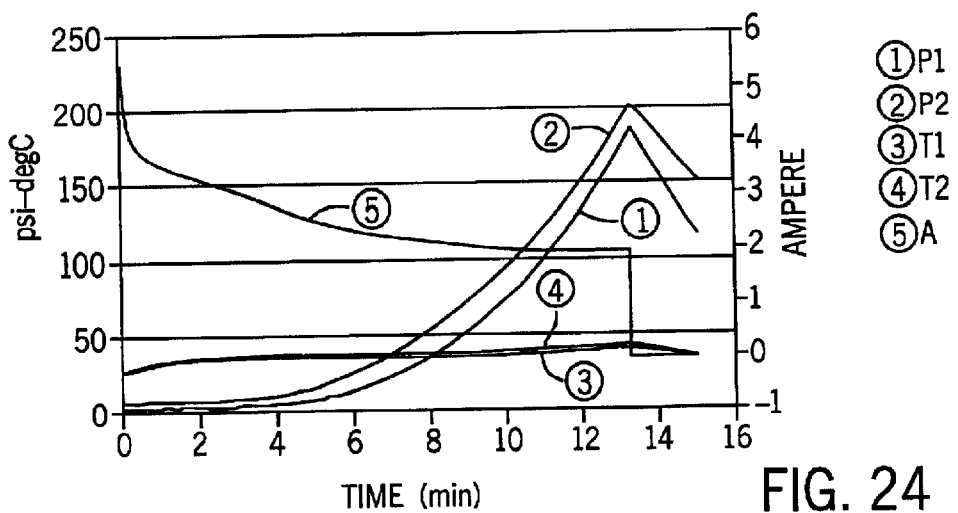
FIG. 24 is a graph plotting pressure, temperature, and current vs. time for plurality of cells under a constant voltage charge.

Referring to FIG. 24, two even smaller 550 mAh Nickel metal hydride cells were connected in series and charged with a constant voltage charge source at 1.65 V per cell. The internal pressure, temperature, and Amperage were measured and plotted vs. time.

Figure 25:
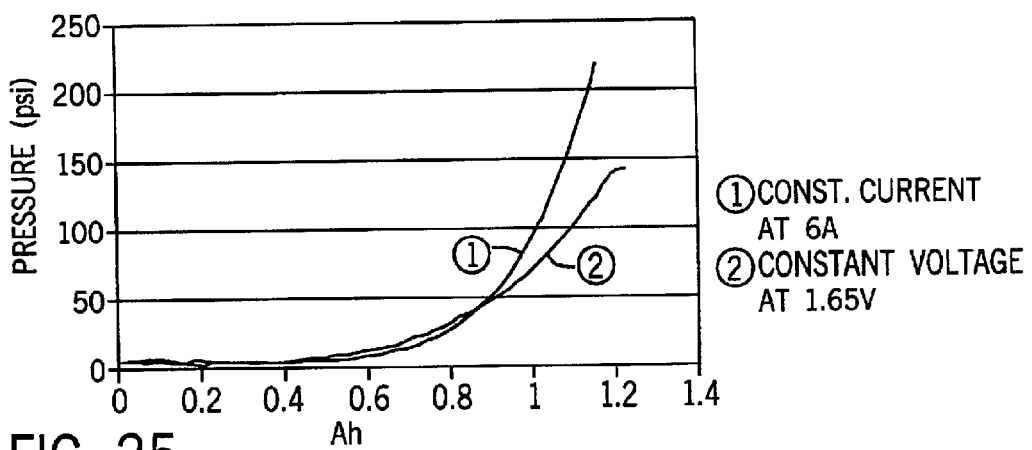
FIG. 25 is a graph plotting and comparing internal pressure vs. capacity during constant current charging versus constant voltage charging.
Figure 26:
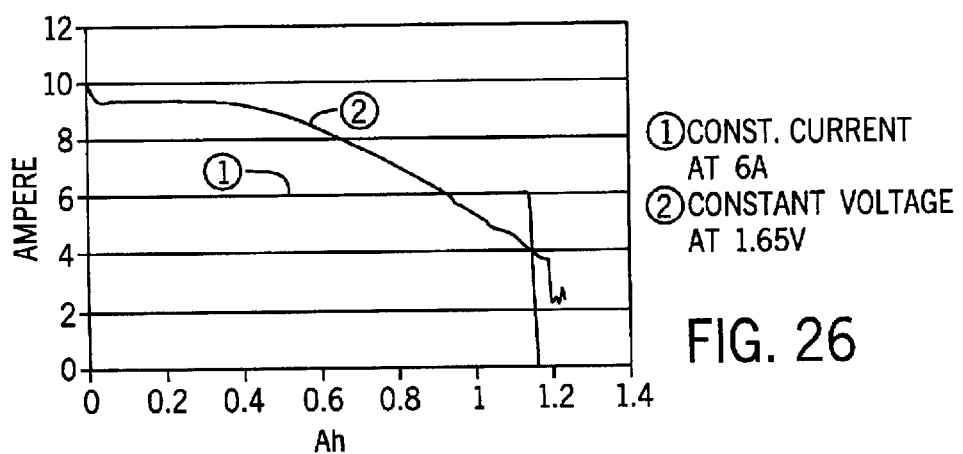
FIG. 26 is a graph illustrating and comparing the current profile of two cells during charging under constant voltage versus constant current.
Figure 27:
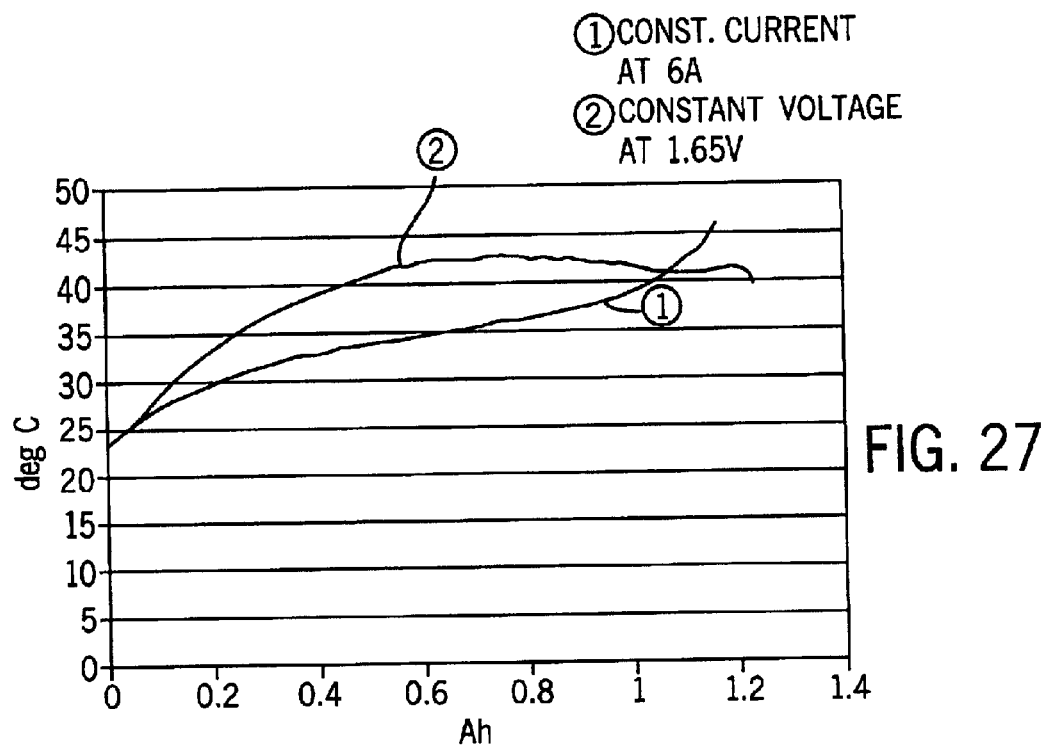
FIG. 27 is a graph plotting and comparing cell temperature vs. capacity for two cells charged under constant current versus constant voltage, respectively.
Figure 28:
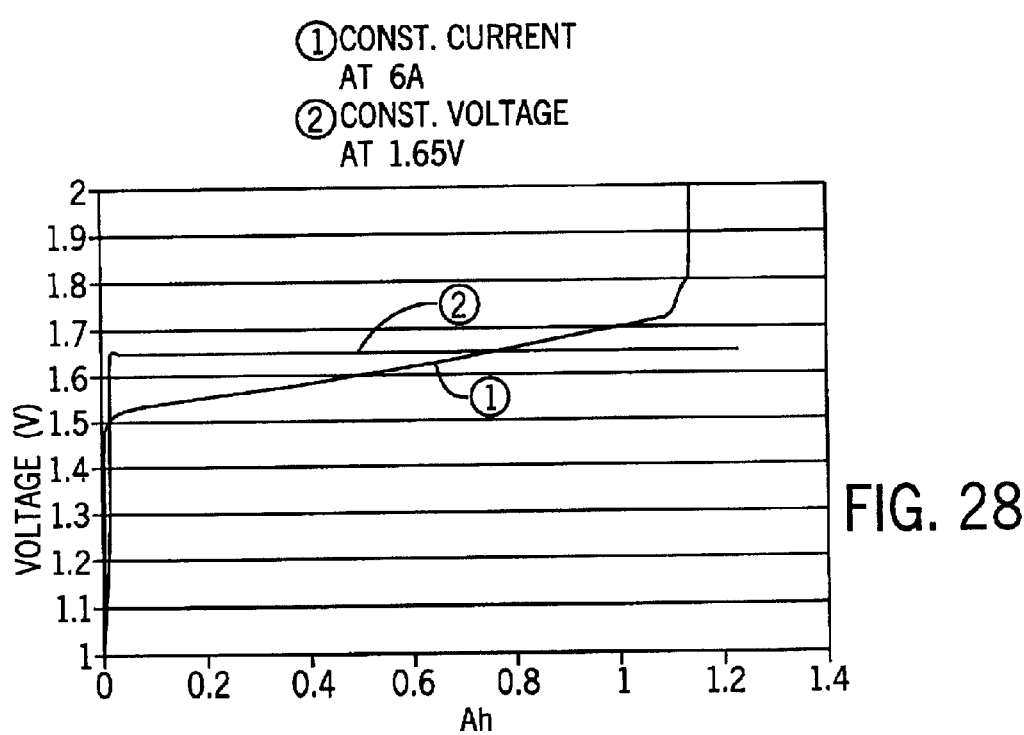
FIG. 28 is a graph plotting and comparing the voltage profile vs. time for the two cells illustrated in FIG. 27.

FIG. 25 illustrates internal cell pressure as a function of capacity for a first cell charged under a constant current at 6A, and a second cell charged under constant voltage at 1.65V. FIG. 26 illustrates cell current as a function of capacity for the first and second cells. FIG. 27 illustrates internal cell temperature as a function of capacity for the first and second cells. FIG. 28 illustrates cell voltage as a function of capacity for the first and second cells. As illustrated, one significant advantage of constant voltage over constant current is the ability of charging current to taper towards then end of the charge as cell voltage rises closer to the applied voltage. The tapering effect results in a lower pressure rise and lower temperature rise at end of charge, thereby allowing the cell to become more filly charged. The drop in current also produces a net lower temperature rises for the same charging period.

Figure 29:
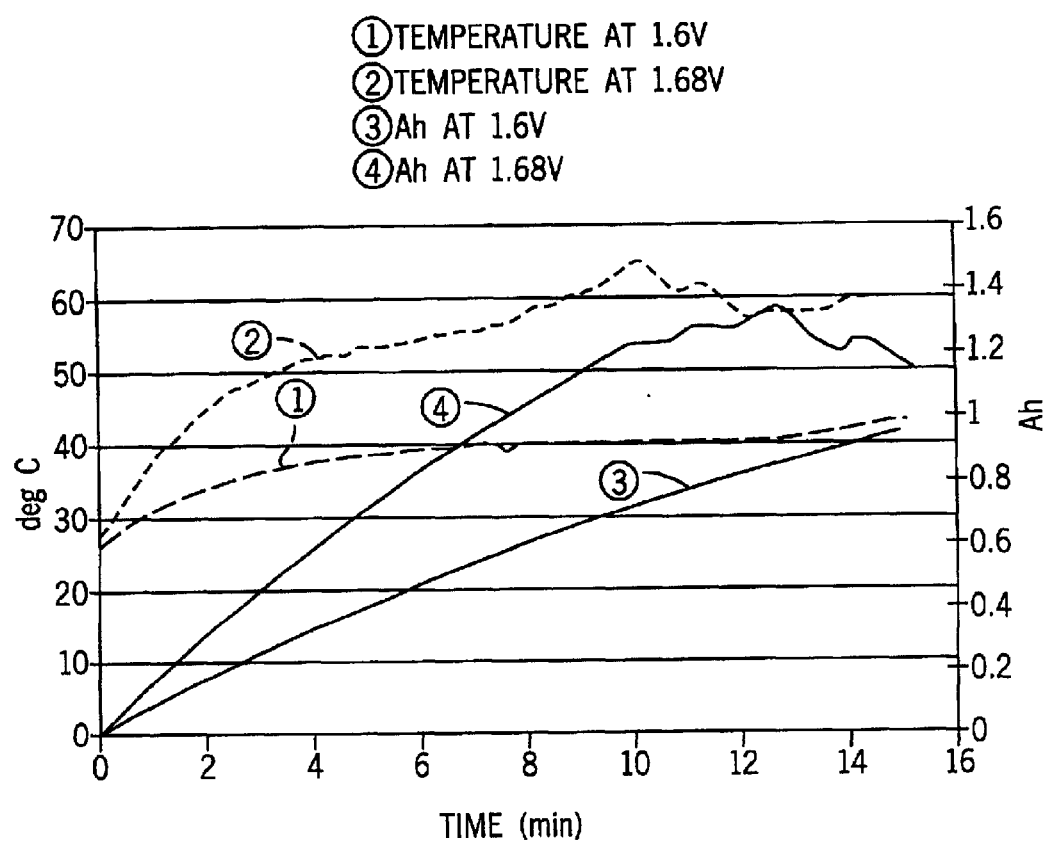
FIG. 29 is a graph plotting and comparing temperature and capacity vs. time during charging under varying constant voltages.

Referring now to FIG. 29, cell temperature and charge input capacity are plotted as a function of time for two cells charged under two different voltage conditions. It may be observed that a higher charge voltage produces a higher charge current for a cell having the same internal resistance. Accordingly, charging is quicker at higher voltage, but the cell is also hotter at higher charge voltage. This figure further illustrates that at higher charge voltages, the cell reaches higher charge state sooner. This also shows that as the pressure activated switch opens in case of the higher charge voltage cell, cell temperature drops as the result of switch on-off condition. Cell continues to accept charge at this state but at lower temperature under intermittent current condition provided by the pressure switch. This is an advantage for having a pressure switch as a means for regulating end of charge condition.

The above description has been that of the preferred embodiment of the present invention, and it will occur to those having ordinary skill in the art that many modifications may be made without departing from the spirit and scope of the invention. In order to apprise the public of the various embodiments that may fall in the scope of the present invention, the following claims are made.

We claim:

1. An axially extending rechargeable electrochemical cell comprising:
   (a) an outer can defining an internal cavity with an open end, an electrode disposed in the internal cavity, and a terminal end cap enclosing the open end; and
   (b) an end cap assembly including:
      i. a flexible member supported by the can, wherein the flexible member flexes from a first position towards a second position in response to internal cell pressure;
      ii. a first conductive element in electrical communication with the terminal end cap;
      iii. a second conductive element in electrical communication with the electrode, and in removable electrical communication with the first conductive element, wherein the second conductive element is in mechanical communication with the flexible member; and
      wherein the flexible member biases the second conductive element out of communication with the first conductive element when the flexible member flexes towards the second position in response to an internal pressure exceeding a predetermined threshold during charging.

2. The electrochemical cell as recited in claim 1, wherein the flexible member returns to the first position from the second position when the internal pressure drops below the predetermined threshold.

3. The electrochemical cell as recited in claim 1, wherein the second conductive element is connected to the flexible member and at least partially axially aligned with the first conductive element, and wherein the second conductive element is displaced axially outwardly when the flexible member is in the second position.

4. The electrochemical cell as recited in claim 1, further comprising a nonconductive spring member disposed between the terminal cap and the flexible member to limit the amount of flexible member displacement and to impose a pre-disposed spring force for maintaining contact between the first and second conductive elements.

5. The cell as recited in claim 1, wherein the flexible member defines a radially inwardly extending cavity at its periphery, the cavity including distal ends of the end cap and first conductive element.

6. The cell as recited in claim 5, wherein the can is crimped over the flexible member to seal the open end of the cell.

7. The cell as recited in claim 1, wherein the terminal end cap is a positive terminal end cap.

8. The cell as recited in claim 1, further comprising a stop washer disposed axially downstream of the first conductive element for limiting axial movement of the first conductive element when the flexible member is in the second position.

9. The electrochemical cell as recited in claim 1, further comprising an aperture extending through the terminal end cap configured to permit gasses to escape from the cell when the internal pressure exceeds the predetermined threshold.

10. The electrochemical cell as recited in claim 1, wherein the flexible member separates the internal cavity of the can from a second internal cavity disposed within the end cap, the cell further comprising an opening extending through the flexible member to provide a conduit between the internal cavity of the can and the second internal cavity.

11. The electrochemical cell as recited in claim 10, further comprising a plug disposed within the opening that is displaceable when the internal pressure reaches a second predetermined threshold.

12. The electrochemical cell as recited in claim 11, wherein the plug is elastically deformable.

13. The electrochemical cell as recited in claim 10, further comprising a spring member disposed within the opening operable to prevent fluid from flowing from the internal cavity of the can from the second internal cavity, wherein the spring member is displaceable when the internal pressure reaches a second predetermined threshold.

14. The electrochemical cell as recited in claim 10, wherein the cell is chargeable under a constant current charge.

15. The electrochemical cell as recited in claim 1, wherein the cell is chargeable at rate faster than one hour.

16. The electrochemical cell as recited in claim 1, wherein the cell is chargeable under a constant voltage charge.

17. The electrochemical cell as recited in claim 1, wherein the cell is chargeable under a varying current charge.

18. The electrochemical cell as recited in claim 17, wherein the varying current charge is a half-wave rectified alternating current charge.

19. The electrochemical cell as recited in claim 17, wherein the varying current charge is a full-wave rectified alternating current charge.

20. The electrochemical cell as recited in claim 17, wherein the varying current charge is an alternating current offset by a direct current.

21. The electrochemical cell as recited in claim 1, wherein the cell is chargeable with a voltage that varies between a minimum threshold and a maximum threshold.

22. The electrochemical cell as recited in claim 1, further comprising a positive and negative electrode, and a gas-impermeable separator disposed between the positive and negative electrodes.

23. An axially extending rechargeable electrochemical cell comprising:
(a) an outer can defining an internal cavity with an open end, a positive and negative electrode disposed in the internal cavity, and a terminal end cap enclosing the open end; and
(b) an end cap assembly including:
i. a flexible member extending radially inwardly from the can, wherein the flexible member flexes from a first position towards a second position in response to internal cell pressure;
ii. a first conductive element in electrical communication with the terminal end cap;
iii. a second conductive element in electrical communication with the positive electrode, and in removable electrical communication with the first conductive element, wherein the second conductive element is in mechanical communication with the flexible member, the second conductive element including:
a) a first contact having one end extending from the positive electrode, and a second end opposite the first end;

b) a second contact extending through the flexible member having a first end in contact with the second end of the first contact, and a second end opposite the first end; and
c) a third contact having a first end in contact with the second end of the second contact, and a second end opposite the first end and in removable contact with the first conductive element
wherein the first and second conductive elements are removed from electrical communication when the flexible member flexes towards the second position in response to an internal pressure exceeding a predetermined threshold during charging.

24. A rechargeable electrochemical cell comprising:
(a) an outer can defining an internal cavity that is closed by a terminal end cap; and
(b) an electrode disposed in the cavity; and
(c) end cap assembly including:
i. first and second contacts in removable electrical communication with each other, wherein an electrical path is formed between the terminal end cap and the electrode when the contacts are in communication, and wherein the electrical path is broken when the contacts are removed from communication; and
ii. a pressure-responsive flexible member in addition to the contacts that, in response to an elevated internal cell pressure, flexes and directly biases one of the contacts away from the other to break the electrical path.

25. The electrochemical cell as recited in claim 24, wherein the second contact is in electrical communication with the electrode when the path is broken, and wherein the flexible member directly biases the second contact.

26. The electrochemical cell as recited in claim 25, wherein the flexible member carries the second contact.

27. The electrochemical cell as recited in claim 24, wherein the flexible member carries the directly biased contact.

28. The electrochemical cell as recited in claim 27, wherein at least a portion of the flexible member is displaced a distance substantially equal to a distance that the directly biased contact is displaced when the flexible member flexes.

29. The electrochemical cell as recited in claim 27, wherein the flexible member further comprises an inwardly extending arm that terminates at a centrally disposed hub, wherein the hub carries the directly biased contact.

30. The electrochemical cell as recited in claim 24, wherein the directly biased conductive element is substantially centrally disposed in the internal cavity.

31. The electrochemical cell as recited in claim 24, wherein the flexible member provides a seal at its periphery with the outer can.

32. The electrochemical cell as recited in claim 31, wherein the outer can is crimped over the flexible member to seal the cell.

33. The electrochemical cell as recited in claim 32, wherein the flexible member further retains the terminal end cap.

34. The electrochemical cell as recited in claim 33, wherein the flexible member comprises an insulator.

35. The electrochemical cell as recited in claim 34, further comprising a vent extending through the flexible member that enables pressurized cell contacts to flow out the cell.

36. A rechargeable electrochemical cell comprising:
(a) an outer can defining an internal cavity that is closed by a terminal end cap; and (b) an electrode disposed in the cavity; and
(c) an end cap assembly including:
  i. a nonconductive flexible member extending radially inwardly from the outer can, wherein the flexible member flexes from a first position to a second position in response to internal cell pressure;
  ii. first and second contacts in removable electrical communication with each other to form an electrical path extending through the flexible member between the terminal end cap and the electrode, wherein the path is broken when the flexible member flexes to the second position.

37. The electrochemical cell as recited in claim 36, wherein one of the contacts moves in concert with the flexible member.

38. The electrochemical cell as recited in claim 36, wherein the flexible member directly biases one of the contacts away from the other contact.

39. The electrochemical cell as recited in claim 38, wherein the flexible member carries one the directly biased contact.

40. The electrochemical cell as recited in claim 36, wherein the flexible member defines a centrally disposed opening, wherein the electrical path extends through the opening.

41. The electrochemical cell as recited in claim 36, wherein at least one of the contacts is linked to the electrode via a flexible tab.

42. The electrochemical cell as recited in claim 36, further comprising a vent extending through the flexible member that permits pressurized cell contents to flow out the cell.

43. The electrochemical cell as recited in claim 36, wherein the flexible member returns to the first position when the internal cell pressure abates.

44. A rechargeable electrochemical cell comprising:
(a) an outer can defining an internal cavity that is closed by a terminal end cap; and
(b) an electrode disposed in the cavity; and
(c) an end cap assembly including:
  i. first and second contacts in removable electrical communication with each other to form an electrical path between the terminal end cap and the electrode; and
  ii. a flexible grommet extending radially inwardly from the can, wherein the grommet flexes from a first position to a second position in response to an elevated internal cell pressure to break the electrical path.

45. The electrochemical cell as recited in claim 44, wherein the outer can is crimped about a periphery of the flexible grommet to close the internal cavity.

46. The electrochemical cell as recited in claim 45, wherein the periphery of the flexible grommet houses the terminal end cap.

47. The electrochemical cell as recited in claim 46, wherein the flexible grommet is insulating.

48. The electrochemical cell as recited in claim 44, wherein the grommet directly biases one of the contacts away from the other in response to the elevated internal cell pressure.

49. The electrochemical cell as recited in claim 48, wherein the grommet carries the directly biased contact.

50. The electrochemical cell as recited in claim 46, further comprising a vent extending through the grommet to allow pressurized cell contents to flow out the cell.

51. A rechargeable electrochemical cell comprising:
(a) an outer can defining an internal chamber that is closed by a terminal end cap; and
(b) an electrode; and
(c) an end cap assembly including a flexible member extending radially inwardly from an axially extending portion of the outer can to divide the internal chamber into an active cell cavity housing the electrode, and a switching cavity that houses a first and second contact that connect to close an electrical path extending between the terminal end cap and the electrode, wherein the flexible member flexes and breaks the electrical path in response to an elevated internal cell pressure.

52. The electrochemical call as recited in claim 51, wherein the active cell cavity is in fluid communication with the switching cavity.

53. The electrochemical cell as recited in claim 52, further comprising a vent extending through the flexible member.

54. The electrochemical cell as recited in claim 53, wherein the second contact is in electrical communication with the electrode when the path is broken, and wherein the flexible member directly biases the second contact.

55. The electrochemical cell as recited in claim 54, wherein the flexible member carries the directly biased contact.

56. The electrochemical cell as recited in claim 55, wherein the flexible member further comprises an inwardly extending arm that terminates at a centrally disposed hub, wherein the hub carries the directly biased contact.

57. The electrochemical cell as recited in claim 51, wherein the flexible member provides a seal at its periphery with the outer can.

58. The electrochemical cell as recited in claim 57, wherein the outer can is crimped over the flexible member to seal the cell.

59. The electrochemical cell as recited in claim 58, wherein the flexible member comprises an insulator.

60. A rechargeable electrochemical cell comprising:
(a) an outer can defining an internal cavity that is closed by a terminal end cap; and
(b) an electrode disposed in the cavity; and
(c) end cap assembly including:
  i. first and second contacts in removable electrical communication with each other, wherein an electrical path is formed between the terminal end cap and the electrode when the contacts are in communication, and wherein the electrical path is broken when the contacts are removed from communication; and
  ii. a pressure-responsive flexible member in addition to the contacts that becomes displaced in response to an elevated internal cell pressure and, in turn, displaces one of the contacts a distance substantially equal to the displacement of the flexible member to break the electrical path.

61. The electrochemical cell as recited in claim 60, wherein the second contact is in electrical communication with the electrode when the path is broken, and wherein the flexible member directly biases the second contact.

62. The electrochemical cell as recited in claim 61, wherein the flexible member carries the second contact.

63. The electrochemical cell as recited in claim 62, wherein the flexible member further comprises an inwardly extending arm that terminates at a centrally disposed hub, wherein the hub carries the directly biased contact.

64. The electrochemical cell as recited in claim 60, wherein the flexible member provides a seal at its periphery with the outer can.

65. The electrochemical cell as recited in claim 64, wherein the outer can is crimped over the flexible member to seal the cell.

66. The electrochemical cell as recited in claim 65, wherein the flexible member comprises an insulator.

67. The electrochemical cell as recited in claim 60, further comprising a vent extending through the flexible member that enables pressurized cell contacts to flow out the cell.

68. A rechargeable electrochemical cell comprising:
(a) an outer can defining an internal chamber having an open end that is closed by a terminal end cap; and
(b) an electrode disposed in the chamber; and
(c) an end cap assembly including:
  i. first and second contacts in removable electrical communication with each other to form an electrical path between the terminal end cap and the electrode; and
  ii. a flexible member in addition to the contacts, wherein the flexible member includes an outer portion proximal the can and an inner portion extending radially inwardly from the outer portion, wherein the flexible member flexes from a first position to a second position in response to an elevated internal cell pressure to break the electrical path,
wherein the outer can is crimped about an outer portion of the flexible member to provide a seal at the open end.

69. The electrochemical cell as recited in claim 68, wherein an outer portion of the terminal end cap is disposed in a groove formed at an outer periphery of the flexible member.

70. The electrochemical cell as recited in claim 69, wherein the flexible member is insulating.

71. The electrochemical cell as recited in claim 68, further comprising a vent extending through the flexible member that enables pressurized cell contacts to flow out the cell.

72. The electrochemical cell as recited in claim 68, wherein the second contact is in electrical communication with the electrode when the path is broken, and wherein the flexible member biases the second contact away from the first contact.

73. The electrochemical cell as recited in claim 72, wherein the flexible member carries the second contact.

74. A rechargeable electrochemical cell comprising:
(a) an outer can extending along a centrally disposed axis, the can defining an internal chamber having an open end that is closed by a terminal end cap; and
(b) an electrode disposed in the chamber; and
(c) an end cap assembly including:
  i. first and second contacts in removable electrical communication with each other to form an electrical path between the terminal end cap and the electrode; and
  ii. a flexible member extending from the can and symmetrically disposed about the axis, wherein the flexible member flexes from a first position to a second position in response to an elevated internal cell pressure to urge one of the contacts away from the other and break the electrical path.

75. The rechargeable electrochemical cell as recited in claim 74, wherein the first contact is in communication with the terminal end cap and the second contact is in communication with the electrode, wherein the second contact is the urged contact.

* * * * *

UNITED STATES PATENT AND TRADEMARK OFFICE
CERTIFICATE OF CORRECTION

PATENT NO. : 6,878,481 B2
DATED : April 12, 2005
INVENTOR(S) : William C. Bushong et al.

It is certified that error appears in the above-identified patent and that said Letters Patent is hereby corrected as shown below:

Column 14,
Line 44, "nism (DELETE seal 4) can" should be -- nism can --

Column 17,
Line 57, "fill" should be -- full --

Column 23,
Line 54, "filly" should be -- fully --

Signed and Sealed this

Seventh Day of June, 2005

JON W. DUDAS
*Director of the United States Patent and Trademark Office*